United States Patent
Dharmarajan et al.

(10) Patent No.: US 11,390,733 B2
(45) Date of Patent: Jul. 19, 2022

(54) ELASTOMERIC FORMULATIONS COMPRISING BRANCHED EPDM POLYMERS

(71) Applicant: ExxonMobil Chemical Patents Inc., Baytown, TX (US)

(72) Inventors: Narayanaswami Dharmarajan, Houston, TX (US); Zhifeng Bai, Houston, TX (US); Andy H. Tsou, Houston, TX (US); Rhutesh K. Shah, Katy, TX (US); John R. Hagadorn, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 219 days.

(21) Appl. No.: 16/689,214

(22) Filed: Nov. 20, 2019

(65) Prior Publication Data

US 2020/0172717 A1 Jun. 4, 2020

Related U.S. Application Data

(60) Provisional application No. 62/772,746, filed on Nov. 29, 2018.

(51) Int. Cl.
| | |
|---|---|
| *C08L 23/16* | (2006.01) |
| *C08K 3/013* | (2018.01) |
| *C08K 5/00* | (2006.01) |

(52) U.S. Cl.
CPC .............. *C08L 23/16* (2013.01); *C08K 3/013* (2018.01); *C08K 5/0025* (2013.01)

(58) Field of Classification Search
CPC ............................... C08L 23/16; C08F 210/18
See application file for complete search history.

(56) References Cited

U.S. PATENT DOCUMENTS

| | | | |
|---|---|---|---|
| 6,410,650 B1 * | 6/2002 | Koda | ..................... C08F 210/18 |
| | | | 525/191 |
| 2018/0244817 A1 * | 8/2018 | Hagadorn | ........... C08F 4/65908 |

FOREIGN PATENT DOCUMENTS

| | | |
|---|---|---|
| WO | 2016/114914 A1 | 7/2016 |
| WO | 2016/114915 A1 | 7/2016 |
| WO | 2016/114916 A1 | 7/2016 |

OTHER PUBLICATIONS

Ravishankar, P.S. Rubber Chemistry and Technology 2012, 85 (3) 327.

* cited by examiner

*Primary Examiner* — Irina S Zemel
*Assistant Examiner* — Jeffrey S Lenihan

(57) ABSTRACT

A compound suitable for use in producing articles including foamed articles can include 100 parts per hundred rubber (phr) of a branched ethylene propylene diene monomer (EPDM) elastomer comprising 35 wt % to 70 wt % ethylene derived units, 20 wt % to 64 wt % propylene derived units, and 1 wt % to 10 wt % diene derived units, wherein the EPDM elastomer has a Mooney viscosity (ML) (1+4) at 125° C. of 30 MU to 120 MU, a corrected Mooney relaxation area (cMLRA) at 80 ML of 300 MU·sec to 1000 MU·sec, and long chain branching (LCB) g' (vis) of 0.80 to 1.0; 75 phr to 200 phr of a filler; 25 phr to 125 phr of a processing oil; 5 phr to 50 phr of a curative, and optionally 0.1 phr to 25 phr of a foaming agent.

19 Claims, 2 Drawing Sheets

ELASTOMERIC FORMULATIONS COMPRISING BRANCHED EPDM POLYMERS

CROSS-REFERENCE OF RELATED APPLICATION

This application claims the benefit of Provisional Application No. 62/772,746, filed Nov. 29, 2018, the disclosure of which is incorporated herein by reference.

BACKGROUND

The present disclosure relates to compositions comprising a branched ethylene propylene diene monomer (EPDM) elastomer, and in particular, compositions comprising branched EPDM elastomers, articles made therefrom, and methods of making the same.

Ethylene/α-olefin/non-conjugated polyene copolymer rubbers, such as EPDM elastomers, have outstanding performance in terms of weatherability, heat resistance, and ozone resistance. As a result, rubber compositions containing such elastomers, cross-linked products of the compositions, and foamed products of the compositions have been broadly used for automotive parts, industrial rubber articles, and industrial roofing. Specifically, EPDM foams (sponges) obtained by vulcanizing and foaming an EPDM rubber have been used as sealing material for a variety of industrial products.

However, EPDM elastomers are typically linear with a narrow molecular weight distribution (e.g., about 2.0 or less). As a result, compounds comprising EPDM elastomers are deficient in extrusion and foaming applications in that there is reduced throughput, reduced dimensional stability of the extruded profile, and a propensity to melt fracture at high shear rates. To surmount these limitations, EPDM elastomers can be synthesized with a metallocene catalyst in a series reactor where in the first reactor a very high molecular fraction is produced and in the second reactor, a lower molecular weight fraction that is closer to the viscosity of the polymer product is synthesized. This synthesis method broadens the molecular weight distribution of the EPDM elastomers through the incorporation of the high molecular weight chains produced in the first reactor. These polymers are mainly bi-modal in molecular weight distribution representing each of the reactor fractions. However, these EPDM elastomers are largely devoid of long chain branching (LCB).

SUMMARY OF THE INVENTION

The present disclosure relates to compositions comprising a branched EPDM elastomer, and in particular, compositions comprising branched EPDM elastomers, articles made therefrom, and methods of making the same.

An example embodiment is a compound comprising: 100 parts per hundred rubber (phr) of a branched ethylene propylene diene monomer (EPDM) elastomer comprising 35 wt % to 70 wt % ethylene derived units, 20 wt % to 64 wt % propylene derived units, and 1 wt % to 10 wt % diene derived units, wherein the EPDM elastomer has a Mooney viscosity (ML) (1+4) at 125° C. of 30 MU to 120 MU, a corrected Mooney relaxation area (cMLRA) at 80 ML of 300 MU·sec to 1000 MU·sec, and long chain branching (LCB) g' (vis) of 0.80 to 1.0; 75 phr to 200 phr of a filler; 25 phr to 125 phr of a processing oil; and 5 phr to 50 phr of a curative.

Another example embodiment is a method comprising: producing a compound comprising: 100 parts per hundred rubber (phr) of a branched ethylene propylene diene monomer (EPDM) elastomer comprising 35 wt % to 70 wt % ethylene derived units, 20 wt % to 64 wt % propylene derived units, and 1 wt % to 10 wt % diene derived units, wherein the EPDM elastomer has a Mooney viscosity (ML) (1+4) at 125° C. of 30 MU to 120 MU, a corrected Mooney relaxation area (cMLRA) at 80 ML of 300 MU·sec to 1000 MU·sec, and long chain branching (LCB) g' (vis) of 0.80 to 1.0; 75 phr to 200 phr of a filler; 25 phr to 125 phr of a processing oil; and 5 phr to 50 phr of a curative; and vulcanizing the compound.

Yet another example embodiment is a method comprising: polymerizing ethylene monomers, propylene monomers, and diene monomers in the presence of 2-(8-anilino-5,6,7,8-tetrahydronaphthalen-1-yl)-N-(2,6-diisopropylphenyl) quinolin-8-amido hafnium dimethyl and dimethylanilinium tetrakis(pentafluorophenyl)borane to produce a branched ethylene propylene diene monomer (EPDM) elastomer comprising 35 wt % to 70 wt % ethylene derived units, 20 wt % to 64 wt % propylene derived units, and 1 wt % to 10 wt % diene derived units, wherein the EPDM elastomer has a Mooney viscosity (ML) (1+4) at 125° C. of 30 MU to 120 MU, a corrected Mooney relaxation area (cMLRA) at 80 ML of 300 MU·sec to 1000 MU·sec, and long chain branching (LCB) g' (vis) of 0.80 to 1.0.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
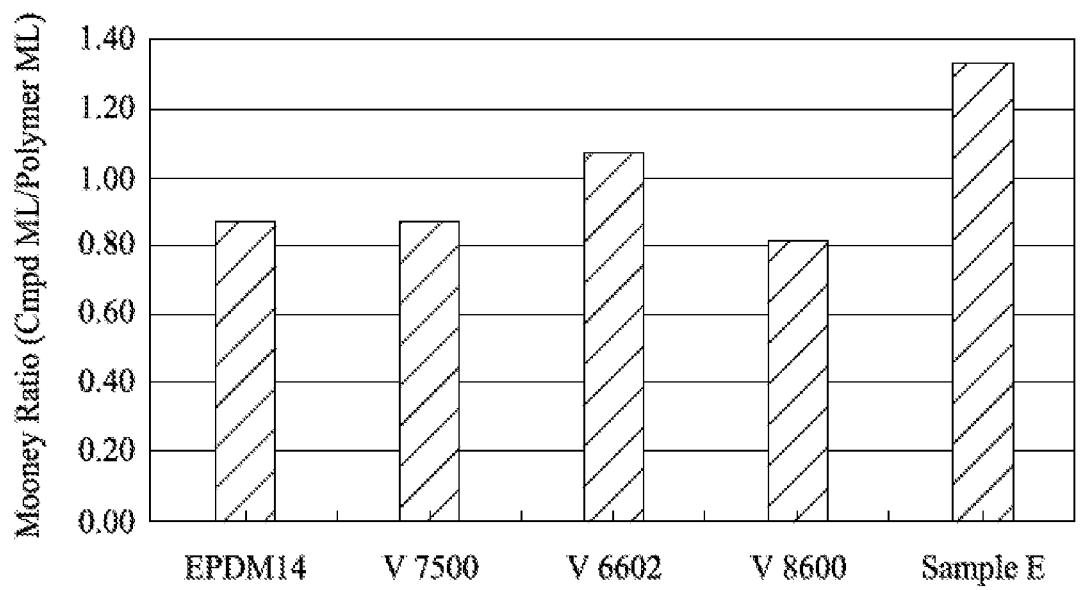
FIG. 1 shows the Mooney Ratio for the inventive polymer and the corresponding VISTALON™ (ethylene propylene diene copolymers, available from ExxonMobil Chemical Company) control samples.

The present disclosure relates to compositions comprising a branched EPDM elastomer, and in particular compositions comprising metallocene catalyzed EPDM elastomers, articles made therefrom, and methods of making the same. More specifically, the branched EPDM elastomers are synthesized by organometallic coordinative living chain transfer polymerization through the use of quinolinyldiamido transition metal complexes and catalyst systems with an activator and a metal hydrocarbenyl chain transfer agent (e.g., an aluminum vinyl-transfer agent (AVTA)). The chain transferred in vinyl branching agent from AVTA during insertion polymerization allows the propagating chains to branch and to branch-on-branch forming LCB of higher generations without gelation and can deliver rheologically equivalent compounds comparable to compounds containing a hyper-branched commercial EPDM elastomers (e.g., VISTALON™ 7500). Without being limited by theory, the extent of and type of branching results in properties that include low compound tan δ at low frequency and a low Mooney ratio (compound Mooney/polymer Mooney). The lower compound tan δ at low frequency is indicative of dimensional stability during vulcanization in a continuous process, while the lower Mooney ratio provides a favorable balance of mechanical property and compound processability.

Definitions and Test Methods

Table 1 provides the methods by which various measurements described herein are performed.

TABLE 1

| Measurement | Method |
|---|---|
| number average molecular weight (Mn) | 4D Gel Permeation Chromatography (below) |
| weight average molecular weight (Mw) | 4D Gel Permeation Chromatography (below) |
| z-average molecular weight (Mz) | 4D Gel Permeation Chromatography (below) |
| polydispersity index (PDI) | Mw divided by Mn |
| LCB g'(vis) | 4D Gel Permeation Chromatography (below) |
| Mooney viscosity (ML) (MU) | ASTM D1646-17 ((1 + 4), 125° C., 2 s$^{-1}$ shear rate) (below) |
| Mooney relaxation area (MLRA) (MU · sec) | ASTM D1646-17 (125° C., 2 s$^{-1}$ shear rate) (below) |
| corrected MLRA (cMLRA) (MU · sec) | described below |
| Mooney ratio | ML of compound divided by ML of EPDM |
| Ethylene-derived unit content (C2%) (wt %) | ASTM D3900-17 and is not corrected for diene content |
| diene-derived unit content (wt %) | ENB content is determined using LTIR according to ASTM D6047-17; content for other dienes is obtained using C$^{13}$ NMR (below) |
| tear strength (Die C) | ASTM D624-00(2012) (average peak value) |
| Mooney Scorch | ASTM D1646-17 (125° C.) |
| cure-development characteristics | ASTM D2084-17 with an oscillating disc rheometer (ODR) (180° C., ±3° arc) |
| hardness (Shore A) | ASTM D2240 |
| 100% modulus (MPa) | ASTM D412-16 (die C) |
| 300% modulus (MPa) | ASTM D412-16 (die C) |
| stress at break (MPa) | ASTM D638-14 |
| strain at break (%) | ASTM D638-14 |
| complex modulus (G*) | Small Angle Oscillatory Shear (below) |
| complex viscosity (η*) | Small Angle Oscillatory Shear (below) |
| phase angle (δ) | Small Angle Oscillatory Shear (below) |

GPC 4D Procedure for Molecular Weight, Comonomer Composition, and Long Chain Branching Determination by GPC-IR Hyphenated with Multiple Detectors. Unless otherwise indicated, the distribution and the moments of molecular weight (Mw, Mn, Mw/Mn, etc.), the comonomer content (C2, C3, C6, etc.) and the branching index (g'vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-µm Teflon filter and degassed with an online degasser before entering the GPC instrument. The nominal flow rate is 1.0 ml/min and the nominal injection volume is 200 µL. The whole system including transfer lines, columns, and detectors are contained in an oven maintained at 145° C. The polymer sample is weighed and sealed in a standard vial with 80-µL flow marker (Heptane) added to it. After loading the vial in the auto sampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (1), using the following equation: c=βI, where β is the mass constant. The mass recovery is calculated from the ratio of the integrated area of the concentration chromatography over elution volume and the injection mass, which is equal to the pre-determined concentration multiplied by injection loop volume. The conventional molecular weight (IR MW) is determined by combining universal calibration relationship with the column calibration, which is performed with a series of monodispersed polystyrene (PS) standards ranging from 700 to 10M gm/mole. The MW at each elution volume is calculated with (1):

$$\log M = \frac{\log(K_{PS}/K)}{a+1} + \frac{a_{PS}+1}{a+1}\log M_{PS} \qquad (1)$$

where the variables with subscript "PS" stand for polystyrene while those without a subscript are for the test samples. In this method, $a_{PS}$=0.67 and $K_{PS}$=0.000175 while $a$ and $K$ are for other materials as calculated and published in literature (Sun, T. et al. *Macromolecules* 2001, 34, 6812), except that for purposes of this invention and claims thereto, $\alpha$=0.695 and K=0.000579 for linear ethylene polymers, $\alpha$=0.705 and K=0.0002288 for linear propylene polymers, $\alpha$=0.695 and K=0.000181 for linear butene polymers, $\alpha$ is 0.695 and K is 0.000579*(1−0.0087*w2b+0.000018*(w2b)

^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1-0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for C3, C4, C6, C8, and so on co-monomers, respectively:

$$w2 = f * SCB/1000TC \quad (2).$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained:

$$\text{Bulk } IR \text{ ratio} = \frac{\text{Area of } CH_3 \text{ signal within integration limits}}{\text{Area of } CH_2 \text{ signal within integration limits}}. \quad (3)$$

Then the same calibration of the CH3 and CH2 signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then, $$w2b = f * \text{bulk } CH3/1000TC \quad (4)$$

$$\text{bulk } SCB/1000TC = \text{bulk } CH3/1000TC - \text{bulk } CH3end/1000TC \quad (5)$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c. \quad (6)$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A} \quad (7)$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation [η]=$\eta_S$/c, where c is concentration and is determined from the IR5 broadband channel output. The viscosity MW at each point is calculated as $M = K_{PS} M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i} \quad (8)$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and α are for the reference linear polymer, which are, for purposes of this invention and claims thereto, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1-0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

Complex modulus (G*), complex viscosity (η*), and the phase angle (δ) measurements: Small Angle Oscillatory Shear (SAOS) measurements were carried out using the ATD® 1000 Rubber Process Analyzer from Alpha Technologies. A sample of approximately 5.4 gm weight is mounted between the parallel plates of the ATD® 1000. The test temperature is 100° C., the applied strain is 14% and the frequency was varied from 0.1 rad/s to 200 rad/s.

Mooney Large viscosity (ML) and Mooney Relaxation Area (MLRA): ML and MLRA are measured using a Mooney viscometer according to ASTM D-1646, modified as detailed in the following description. First, an oven-dried polymer sample for Mooney testing is prepared by being pressed into a flat sheet using a hot press at 150° C. for 3 minutes, to remove any water, solvent, and unreacted monomers from the sample. After 3 minutes, if there are any visible bubbles/voids, the sheet is folded and pressed again between the hot plates of the hot press for an additional 3 minutes. Once the sample is cooled, about 25 g is used for Mooney testing. For Mooney testing, the sample is placed on either side of the rotor. The cavity is filled by pneumatically lowering the upper platen. The upper and lower platens are electrically heated and controlled at 125° C. The torque to turn the rotor at 2 rpm is measured by a torque transducer. Mooney viscometer is operated at an average shear rate of $2\ s^{-1}$. The sample is pre-heated for 1 minute after the platens are closed. The motor is then started and the torque is recorded for a period of 4 minutes. The results are reported as ML (1+4) 125° C., where M is the Mooney viscosity number, L denotes large rotor, 1 is the pre-heating time in minutes, 4 is the sample run time in minutes after the motor starts, and 125° C. is the test temperature.

The MLRA data is obtained from the Mooney viscosity measurement when the rubber relaxes after the rotor is stopped. The MLRA is the integrated area under the Mooney torque-relaxation time curve from 1 to 100 seconds. The MLRA is a measure of chain relaxation in molten polymer and can be regarded as a stored energy term which suggests that, after the removal of an applied strain, the longer or branched polymer chains can store more energy and require longer time to relax. Therefore, the MLRA value of a bimodal rubber (the presence of a discrete polymeric fraction with very high molecular weight and distinct composition) or a long chain branched rubber are larger than a broad or a narrow molecular weight rubber when compared at the same Mooney viscosity values.

Mooney Relaxation Area is dependent on the Mooney viscosity of the polymer, and increases with increasing Mooney viscosity. In order to remove the dependence on polymer Mooney Viscosity, a corrected MLRA (cMLRA) parameter is used, where the MLRA of the polymer is normalized to a reference of 80 Mooney viscosity. The formula for cMLRA is provided below $$cMLRA = MLRA\left(\frac{80}{ML}\right)^{1.44} \qquad (9)$$

where MLRA and ML are the Mooney Relaxation Area and Mooney viscosity of the polymer sample measured at 125° C. Alternatively, the ratio MLRA/ML may be used to encompass both the MLRA and ML data, in view of MLRA's dependence upon ML. This ratio has the dimension of time. A higher MLRA/ML number signifies a higher degree of melt elasticity for materials with similar value of ML. Long chain branching will slow down the relaxation of the polymer chain, hence increasing the value of MLRA/ML.

13C NMR: The $^{13}$C solution NMR was performed on a 10 mm broadband probe using a field of at least 400 MHz in tetrachloroethane-d2 solvent at 120° C. with a flip angle of 90° and full NOE with decoupling. Sample preparation (polymer dissolution) was performed at 140° C. where 0.20 grams of polymer was dissolved in an appropriate amount of solvent to give a final polymer solution volume of 3 ml. Chemical shifts were referenced by setting the ethylene backbone (—$CH_2$—)n (where n>6) signal to 29.98 ppm. Carbon NMR spectroscopy was used to measure the composition of the reactor products as submitted.

Chemical shift assignments for the ethylene-propylene copolymer are described by Randall in 'A Review of High Resolution Liquid $^{13}$Carbon Nuclear Magnetic Resonance Characterization of Ethylene-Based Polymers,' Polymer Reviews, 29:2, pp. 201-317 (1989). The copolymer content (mole and weight %) is also calculated based on the method established by Randall in this paper. Calculations for $r_1r_2$ were based on the equation $r_1r_2=4*[EE]*[PP]/[EP]^2$; where [EE], [EP], [PP] are the diad molar concentrations; E is ethylene, P is propylene.

The values for the methylene sequence distribution and number average sequence lengths were determined based on the method established by James C. Randall, "Methylene sequence distributions and average sequence lengths in ethylene-propylene copolymers," Macromolecules, 1978, 11, 33-36.

EPDM

The branched EPDM elastomers used in the methods and articles of the present invention comprise 35 wt % to 70 wt % ethylene derived units, 20 wt % to 64 wt % propylene derived units, and 1 wt % to 10 wt % diene derived units.

Examples of dienes suitable for use in the branched EPDM elastomers include, but are not limited to, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, ethylene norbornene (ENB). Particularly preferred dienes include ENB, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions. Particularly preferred examples of useful dienes include: ENB, 5-ethylidene-2-norbornene, 1,4-hexadiene, 1,5-heptadiene, 6-methyl-1,6-heptadiene, 1,6-octadiene, 7-methyl-1,7-octadiene, 1,8-decadiene, and 9-methyl-1,9-decadiene. In a preferred embodiment, the diene monomer comprises two different diene monomers, such as ethylidene norbornene and vinyl norbornene.

The branched EPDM elastomers used in the methods and articles of the present invention can have a Mn of 35,000 g/mol to 125,000 g/mol, or alternatively 48,000 g/mol to 115,000 g/mol.

The branched EPDM elastomers used in the methods and articles of the present invention can have a Mw of 125,000 g/mol to 350,000 g/mol, or alternatively 140,000 g/mol to 315,000 g/mol.

The branched EPDM elastomers used in the methods and articles of the present invention can have a Mz of 375,000 g/mol to 1,000,000 g/mol, or alternatively 425,000 g/mol to 915,000 g/mol.

The branched EPDM elastomers used in the methods and articles of the present invention can have a PDI (Mw/Mn) of 2.25 to 4.5, or alternatively 2.5 to 3.75.

The branched EPDM elastomers used in the methods and articles of the present invention can have a Mz/Mn of 5.0 to 12.5, or alternatively 5.5 to 12.0.

The branched EPDM elastomers used in the methods and articles of the present invention can have a LCB g'(vis) of 0.80 to 1.0, or alternatively 0.85 to 0.95.

The branched EPDM elastomers used in the methods and articles of the present invention can have an ML (1+4) at 125° C. of 30 MU to 200 MU, alternatively 30 MU to 60 MU, alternatively 50 MU to 100 MU, or alternatively 90 MU to 200 MU.

The branched EPDM elastomers used in the methods and articles of the present invention can have a MLRA of 100 MU·sec to 1500 MU·sec, alternatively 500 MU·sec to 900 MU·sec, alternatively 100 MU·sec to 750 MU·sec, or alternatively 750 MU·sec to 1500 MU·sec.

The branched EPDM elastomers used in the methods and articles of the present invention can have cMLRA of 300 MU·sec to 1000 MU·sec, alternatively 350 MU·sec to 500 MU·sec, or alternatively 400 MU·sec to 850 MU·sec.

The branched EPDM elastomers used in the methods and articles of the present invention are produced by methods described in US Patent Application Publication No. 2018/0134816, which is incorporated herein by reference. Preferably, the branched EPDM elastomers used in the methods and articles of the present invention are produced by with a pyridyldiamido or quinolinyldiamido transition metal complex represented by formula (I) or (II);

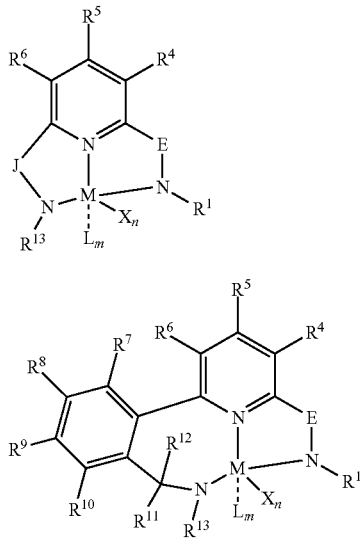

wherein:
M is a Group 3, 4, 5, 6, 7, 8, 9, or 10 metal (preferably M is Zr or Hf);
E is $C(R^2)$ or $C(R^3)(R^{3'})$;
X is an anionic leaving group (preferably X is methyl, chloride, or dialkylamido);
L is a neutral Lewis base (preferably L is ether, amine, phosphine, or thioether);
$R^1$ and $R^{13}$ are independently selected from substituted or unsubstituted hydrocarbyl or silyl groups (preferably $R^1$ & $R^{13}$ are aryl groups, preferably $R^1$ is 2,6-disubstituted aryl, preferably $R^1$ is 2,6-diisopropylphenyl, preferably $R^{13}$ is 2-substituted aryl, preferably $R^{13}$ is phenyl, preferably $R^1$ is 2,6-disubstituted aryl group and $R^{13}$ is an aryl group that is unsubstituted in the 2 and 6 positions);
$R^2$ is a group containing 1-10 carbon atoms that is optionally joined with $R^4$ to form an aromatic ring (preferably $R^2$ & $R^4$ are joined to form a six membered aromatic ring);
$R^3$, $R^{3'}$, $R^4$, $R^5$, $R^6$, $R^7$, $R^8$, $R^9$, $R^{10}$, $R^{11}$, and $R^{12}$ are each independently selected from hydrogen, substituted or unsubstituted hydrocarbyl, alkoxy, silyl, amino, aryloxy, halogen, and phosphino (preferably $R^3$ & $R^{3'}$ are hydrogen);
J is a divalent group that forms a three-atom-length bridge between the pyridine ring and the amido nitrogen (preferably J is selected from:

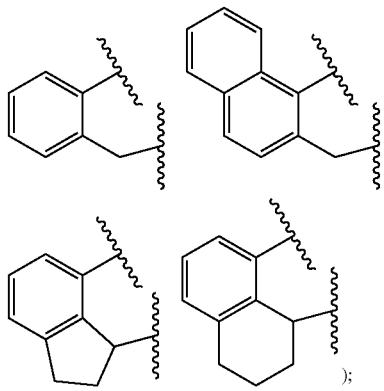

);

n is 1 or 2;
m is 0, 1, or 2; and
two X groups may be joined to form a dianionic group;
two L groups may be joined to form a bidentate Lewis base;
an X group may be joined to an L group to form a monoanionic bidentate group;
adjacent groups from the following $R^3$, $R^{3'}$, $R^4$, $R^5$, $R^6$, $R^7$, $R^8$, $R^9$, $R^{10}$, $R^{11}$, and $R^{12}$ may be joined to form a ring (preferably $R^7$ & $R^8$ are joined to form an aromatic ring, preferably $R^7$ & $R^8$ are joined to form cyclopentyl or cyclohexyl, preferably $R^{10}$ & $R^{11}$ are joined to form a five- or six-membered ring, preferably $R^{10}$ & $R^{11}$ are joined to form cyclopentyl or cyclohexyl).

The branched EPDM elastomers used in the methods and articles of the present invention are produced by (1) contacting monomers comprising propylene, ethylene and diene with a catalyst system comprising an activator (such as an alumoxane or non-coordinating anion activator), a metal hydrocarbenyl chain transfer agent (preferably an aluminum vinyl transfer agent), and one or more single site catalyst complexes, such as a quinolinyldiamido complex represented by the Formula I or II above; and (2) obtaining branched ethylene-propylene-diene terpolymers comprising from about 98.9 to 30 wt % propylene, from 1 to 70 wt % ethylene, from 0.1 to 20 wt % diene monomer, and a remnant of the metal hydrocarbenyl chain transfer agent, wherein said branched ethylene-propylene-diene terpolymer: a) has a $g'_{vis}$ of less than 0.90; b) is essentially gel free (such as 5 wt % or less of xylene insoluble material); c) has an Mw of 250,000 g/mol or more; d) has a Mw/Mn of 3.0 or more; and e) has an Mz of 850,000 g/mol or more, wherein the process preferably has a diene conversion of at least 15% (preferably at least 16%, preferably at least 16.5%) and the ratio of a metal hydrocarbenyl chain transfer agent (such as an aluminum vinyl transfer agent) to the one or more single site catalyst complexes is at least 100:1 (preferably at least 125:1 preferably at least 145:1, alternately from 100:1 to 1,000,000:1, alternately from 125:1 to 500,000:1, alternately from 145:100,000:1).

The catalyst/activator combinations are formed by combining the transition metal complex with activators in any manner known from the literature, including by supporting them for use in slurry or gas phase polymerization. The catalyst/activator combinations may also be added to or generated in solution polymerization or bulk polymerization (in the monomer). The metal hydrocarbenyl chain transfer agent (preferably an aluminum vinyl transfer agent) may be added to the catalyst and or activator before, during or after the activation of the catalyst complex or before or during polymerization. Typically, the metal hydrocarbenyl chain transfer agent (preferably the aluminum vinyl-transfer agent) is added to the polymerization reaction separately, such as before, the catalyst/activator pair.

The polymer produced from the polymerization using the catalyst systems described herein preferably contains at least 0.05 allyl chain ends per polymer chain, 0.1 allyl chain ends per polymer chain, at least 0.2 allyl chain ends per polymer chain, at least 0.3 allyl chain ends per polymer chain, at least 0.4 allyl chain ends per polymer chain, at least 0.5 allyl chain ends per polymer chain, at least 0.6 allyl chain ends per polymer chain, at least 0.7 allyl chain ends per polymer chain, at least 0.8 allyl chain ends per polymer chain, at least 0.8 allyl chain ends per polymer chain, at least 1.0 allyl chain ends per polymer chain. Ethylene-propylene-diene monomer copolymers are particularly preferred products. If the catalyst complex chosen is also capable of incorporating bulky alkene monomers, such as $C_6$ to $C_{20}$ alpha olefins, into the growing polymer chain, then the resulting polymer may contain long chain branches formed by the insertion of an allyl terminated polymer chain formed in situ (also referred to as a "vinyl-terminated macromonomer") into the growing polymer chains. Process conditions including residence time, the ratio of monomer to polymer in the reactor, and the ratio of transfer agent to polymer will affect the amount of long chain branching in the polymer, the average length of branches, and the type of branching observed. A variety of branching types may be formed, which include comb architectures and branch on branch structures similar to those found in low-density polyethylene. The combination of chain growth and vinyl-group insertion may lead to polymer with a branched structure and having one or fewer vinyl unsaturations per polymer molecule. The absence of significant quantities of individual polymer molecules containing greater than one vinyl unsaturation prevents or reduces the formation of unwanted cross-linked polymers. Polymers having long chain branching typically have a g'vis of 0.97 or less, alternately 0.95 or less, alternately 0.90 or less, alternately 0.85 or less, alternately 0.80 or less, alternately 0.75 or less, alternately 0.70 or less, alternately 0.60 or less.

If the catalyst chosen is poor at incorporating comonomers such as $C_2$ to $C_{20}$ alpha olefins, then the polymer obtained is largely linear (little or no long chain branching). Likewise, process conditions including the ratio of transfer agent to polymer will affect the molecular weight of the polymer. Polymers having little or no long chain branching typically have a g'vis of more than 0.97, alternately 0.98 or more.

Alkene polymerizations and co-polymerizations using one or more transfer agents, such as an AVTA, with two or more catalysts are also of potential use. Desirable products that may be accessed with this approach includes polymers that have branch block structures and/or high levels of long-chain branching.

The transfer agent to catalyst complex equivalence ratio can be from about 100:1 to 500,000:1, preferably 115:1 to 450,000:1, preferably 125:1 to 400,000:1. Preferably, the molar ratio of transfer agent to catalyst complex is greater than one. Alternately, the molar ratio of transfer agent to catalyst complex is greater than 125:1. Preferably, the transfer agent is an aluminum vinyl transfer agent (AVTA) and the AVTA to catalyst complex equivalence ratio is greater than 100:1. Preferably the molar ratio of AVTA to catalyst complex is greater than 125:1. More preferred the molar ratio of AVTA to catalyst complex is greater than 145:1.

The AVTA can also be used in combination with other chain transfer agents that are typically used as scavengers, such as trialkylaluminum compounds (where the alkyl groups are selected from $C_1$ to $C_{20}$ alkyl groups, preferably methyl, ethyl, propyl, butyl, pentyl, hexyl, heptyl, octyl, nonyl, decyl, undecyl, dodecyl, or an isomer thereof). Usefully the ATVA can be used in combination with a trialkyl aluminum compound such as tri-n-octylaluminum and tri-isobutylaluminum. The ATVA can also be used in combination with a dialkyl zinc compound, such as diethylzinc, dimethylzinc, or dipropylzinc.

The transfer agent can also be used in combination with oxygen-containing organoaluminums such as bis(diisobutylaluminum)oxide, MMAO-3A, and other alumoxanes. Certain of these oxygen-containing organoaluminums are expected to serve as scavengers while remaining significantly less prone to hydrocarbyl group chain-transfer than typical organoaluminums, such as trimethylaluminum or tri(n-octyl)aluminum.

The production of di-end-functionalized polymers is possible with this technology. One product, prior to exposure to air, from an alkene polymerization performed in the presence of AVTA is the aluminum-capped species $Al(R')_{3-v}(polymer-CH=CH_2)_v$, where v is 0.1 to 3 (alternately 1 to 3, alternately 1, 2, or 3). The Al-carbon bonds will react with a variety of electrophiles (and other reagents), such as oxygen, halogens, carbon dioxide, and the like. Thus, quenching the reactive polymer mixture with an electrophile prior to exposure to atmosphere would yield a di-end-functionalized product of the general formula: Z-(monomers)$_n$-CH=CH$_2$, where Z is a group from the reaction with the electrophile and n is an integer, such as from 1 to 1,000,000, alternately from 2 to 50,000, alternately from 10 to 25,000, alternately from 3 to 900,000, alternately from 10,000 to 850,000, alternately from 20,000 to 800,000. For example, quenching with oxygen yields a polymer functionalized at one end with a hydroxy group and at the other end with a vinyl group. Quenching with bromine yields a polymer functionalized at one end with a Br group and at the other end with a vinyl group.

Functional group terminated polymers can also be produced using functional group transfer agents (FGTA). In this embodiment of the invention, the FGTA is represented by the formula $M^{FGTA}(R')_{3-v}(FG)_v$, with R' and v defined as above, $M^{FGTA}$ a Group 13 element (such as B or Al), and with FG defined as a group containing 1 to 20 carbon atoms and a functional group Z. The choice of FG is such that it is compatible with the catalyst system being used. Preferred Z groups include, but are not limited to, non-vinyl olefinic groups such as vinylidene, vinylene or trisubstituted olefins, cyclics containing unsaturation such as cyclohexene, cyclooctene, vinyl cyclohexene, aromatics, ethers, and metal-capped alkoxides.

In another embodiment of the invention, the polymer products of this invention are of the formula: polymer-$(CH_2)_n$ CH=$CH_2$ where n is from 2 to 18, preferably from 6 to 14, more preferably 6, and where "polymer" is the attached polymeryl chain. Polymers of this formula are particularly well suited in making branch polymer combs. The polymer combs can be made by any number of methods. One method would be to use a catalyst system to make the vinyl terminated polymer, and then use a second catalyst system to incorporate the vinyl terminated polymer into a polymer backbone made from the second catalyst. This can be done sequentially in one reactor by first making the vinyl terminated polymer and then adding a second catalyst and, optionally, different monomer feeds in the same reactor. Alternatively, two reactors in series can be used where the first reactor is used to make the vinyl terminated polymer which flows into a second reactor in series having the second catalyst and, optionally, different monomer feeds. The vinyl terminated polymer can be a soft material, as in an ethylene propylene copolymer (such as ethylene propylene copolymer rubber), low density polyethylene, or a polypropylene, or a harder material, as in an isotactic polypropylene, high density polyethylene, or other polyethylene. Typically, if the vinyl terminated polymer is soft, it is useful if the polymer backbone of the comb is hard; if the vinyl terminated polymer is hard, it is useful if the polymer backbone of the comb is soft. However, any combination of polymer structures and types can be used.

In another embodiment of the invention, the vinyl-terminated polymers (VTPs) of this invention are of formula: polymer-$(CH_2)_n$CH=$CH_2$ where n is from 2 to 18, preferably from 6 to 14, more preferably 6, and where "polymer" is the attached polymeryl chain. VTPs of this formula are particularly well suited in making branch block polymers. The branch block polymers can be made by any number of methods. One method involves using the same catalyst that is used to make the VTP, and then changing polymerization conditions (such as, but not limited to, by changing monomer composition and/or type and/or the amount or presence of AVTA) in the same or different reactor (such as two or more reactors in series). In this case, the branch will have a different polymeric composition vs. the polymer backbone created under the different polymerization conditions. Another method would be to use a catalyst system to make the VTP, then use a second catalyst system to incorporate the VTPs into a polymer backbone made from the second catalyst. This can be done sequentially in one reactor by first making the VTP and then adding a second catalyst and, optionally, different monomer feeds in the same reactor. Alternatively, two reactors in series can be used where the first reactor is used to make the VTP which flows into a second reactor in series having the second catalyst and, optionally, different monomer feeds. The branched block polymers can be of any composition, however, typically a combination of soft and hard polymers (relative to one another) are preferred. For example, an iPP VTP could be produced in a reactor, and then ethylene added to the existing propylene feed to make a rubber EP that would have iPP branches. Alternatively, an iPP VTP could be produced in a first reactor, and then sent to a second reactor containing ethylene (or additional ethylene for a propylene ethylene copolymer and, optionally, additional propylene monomer (and the same or different catalyst) to make a rubber EP that would have iPP branches (or propylene ethylene copolymer branches).

In any embodiment of this invention where the aluminum vinyl transfer agent is present, the aluminum vinyl transfer agent is present at a catalyst complex-to-aluminum vinyl transfer agent molar ratio of from about 1:3000 to 1:100, alternatively 1:2000 to 1:115, alternatively 1:1000 to 1:125.

In a preferred embodiment, the polymerization:
1) is conducted at temperatures of 80° C. to 300° C. (preferably 85° C. to 150° C., preferably 90° C. to 145° C., preferably 95° C. to 140° C.);
2) is conducted at a pressure of atmospheric pressure to 10 MPa (preferably 0.35 MPa to 10 MPa, preferably from 0.45 MPa to 6 MPa, preferably from 0.5 MPa to 5 MPa);
3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents);
4) wherein the ratio of metal hydrocarbenyl transfer agent to catalyst is at least 100:1 (preferably 125:1 or more, preferably 145:1 or more);
5) the polymerization preferably occurs in one reaction zone;
6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr);
7) the diene conversion is 15% or more, preferably 16% or more, preferably 16.5% or more; and
8) optionally hydrogen is present in the polymerization reactor at a partial pressure of 0.001 psig to 50 psig (0.007 kPa to 345 kPa) (preferably from 0.01 psig to 25 psig (0.07 kPa to 172 kPa), more preferably 0.1 psig to 10 psig (0.7 kPa to 70 kPa)). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

Methods for Making the Composition and Articles Comprising the Composition

The branched EPDM described herein can be compounded with other components. The resultant compounds can be useful for producing articles like sealants for sealing between car body opening peripheries and opening/closing members for openings. Examples of such openings can be at doors and trunk lids where the article is used to prevent rain, wind, and sounds from the outside. Such articles may be foamed.

Examples of components that can be included in the compounds include, but are not limited to, fillers, processing aids, curatives, foaming agents, antioxidants, UV stabilizers, accelerators, flame retardants, colorants or pigments, and combinations thereof.

Method of producing such compounds may comprise the steps of: (a) combining a branched EPDM described herein, a filler, a curative, and optionally other additives; and (b) forming the composition. Combining can be by any suitable means. For example, they may be blended in a tumbler, continuous mixer, static mixer, batch mixer, extruder, or a combination thereof that is sufficient to achieve an adequate dispersion of the components. Methods of blending include dry-blending, melt-blending in a batch mixer or in an extruder, or by a combination thereof. Blending may also involve a "masterbatch" approach, where the branched EPDM elastomers are blended with fillers and/or additives with an appropriate amount of pre-blended masterbatch, followed by addition of foaming agents, curing agents, accelerators, and/or other additives to make the final compositions. Dispersion (or "letdown") of the masterbatch may take place as part of a processing step used to fabricate articles, such as in the extruder on an injection molding machine or on a continuous extrusion line, or is during a separate compounding step.

Preferably, the composition is prepared by blending the components in a batch mixer, such as a twin rotor internal mixer equipped with a pressure ram. Mixing can be performed at pressures and temperatures such that the filler and other compounding components are finely incorporated and become uniformly dispersed within the branched EPDM elastomer.

The present invention encompasses a profile (foamed or not) produced using the methods and comprising the compositions of the present invention, and further encompasses a seal article made from the profile, including automotive parts, consumer goods, industrial goods, construction materials, and packaging materials. Examples of the article include, but are not limited to, an extruded article, such as an automotive weather seal, a non-automotive weather seal, a building profile, and the like; a molded article, such as a seal, a gasket, and the like; a hose, such as air hose, heat hose, garden hose, industry hose, and the like; a roof sheet; a film; or a cable jacket; and the like.

The profile may be made or formed by any useful discrete molding or continuous extrusion means for forming and shaping polyolefins known in the art, including: sheet extrusion, profile extrusion or co-extrusion, compression molding, injection molding, co-injection molding, gas-assisted injection molding, transfer molding, foam molding, transfer molding, vacuum forming, lamination, calendering, or other forms of processing such as described in, for example, "Rubber Technology," by Maurice Norton (Van Nostrand Reinhold-New York), or combinations thereof.

The compound prepared as stated above can be extruded from a rubber extruder into a sheet-like shape or the like (molding step), and the extruded composition is heated to be vulcanized and, optionally, foamed (foaming step). It may pass through a two-stage heating zone including a microwave heating chamber to be vulcanized and, optionally, and a hot air heating chamber to produce an extrusion profile (foamed or not).

Heating conditions for the composition are selected appropriately according to the vulcanization initiation temperature of the blended curing agent, the foaming temperature of the blended foaming agent (when used), and the like. For example, using a circulating hot air oven or the like, the foam composition is pre-heated at a temperature in a range of 40° C. to 200° C., or alternatively 60° C. to 160° C., for 1 minute to 30 minutes, alternatively 1 minute to 10 minutes, or alternatively 1 minute to 5 minutes, and then heated at a temperature of not more than 450° C., alternatively in the range of 100° C. to 400° C., or alternatively 120° C. to 350° C. for, 1 minute to 80 minutes, or alternatively 2 minutes to 50 minutes.

Alternatively, using an extruder, the prepared composition can also be continuously extruded (molding step) into a sheet-like shape, while being heated, to be continuously vulcanized and, optionally, foamed (foaming step). In this manner, the composition is vulcanized, while being foamed (when foaming agents are present), and the profile can be obtained.

Alternatively, using a press, the prepared composition can also be molded into a sheet-like shape, while being heated, to be vulcanized and, optionally, foamed (foaming step) at opening of the press. In this manner, the composition is vulcanized, while being foamed (when foaming agents are present), and the sheet can be obtained.

The compounds comprising the branched EPDM elastomers used in the methods and articles of the present invention can have a tan $\delta$ of 0.5 to 0.8, or alternatively 0.6 to 0.7.

The compounds comprising the branched EPDM elastomers used in the methods and articles of the present invention can have a ML of 70 MU to 90 MU, or alternatively 75 MU to 85 MU.

The compounds comprising the branched EPDM elastomers used in the methods and articles of the present invention can have a Mooney ratio of 0.8 to 1.0, or alternatively 0.85 to 0.95.

The compounds comprising the branched EPDM elastomers used in the methods and articles of the present invention can have tear strength (Die C) (green) of 2 N/mm to 10 N/mm, or alternatively 3 N/mm to 8 N/mm.

The compounds comprising the branched EPDM elastomers used in the methods and articles of the present invention can have tear strength (Die C) (press cured at 180° C. for 8 min) of 35 N/mm to 45 N/mm, or alternatively 37 N/mm to 43 N/mm.

Filler

Fillers can be included in the compounds described herein. Examples of fillers include, but are not limited to, carbon black, fly ash, graphite, cellulose, starch, flour, wood flour, and polymeric fibers like polyester-based, polyamide-based materials, calcium carbonate, talc, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organomodified clay or nanoclay, glass microspheres, chalk, and the like, and combinations thereof. Of these fillers, carbon black, calcium carbonate, barium sulfate, antimony oxide, talc, silica/glass, glass fibers, alumina, aluminum trihydroxide, magnesium hydroxide, titanium dioxide, and mixtures thereof are preferred.

Fillers can be included in compounds described herein at 75 parts per hundred rubber (phr) to 200 phr, or alternatively 100 phr to 150 phr.

Processing Aid

Processing aids can be included in the compounds described herein. Examples of processing aids include, but are not limited to, plasticizers, tackifiers, extenders, chemical conditioners, homogenizing agents and peptizers (e.g., such as mercaptans), petroleum and vulcanized vegetable oils, mineral oils, paraffin oils, polybutene oils, naphthenic oils, aromatic oils, waxes, resins, rosins, and the like, and combinations thereof. Some commercial examples of useful processing aids are SUNDEX™ (Sun Chemicals) and FLEXON™ (ExxonMobil Chemical Company).

Processing aids can be included in compounds described herein at 25 phr to 125 phr, or alternatively 50 phr to 100 phr.

Curative

Curatives can be included in the compounds described herein. Examples of curatives include, but are not limited to, sulfur, zinc oxide, and fatty acids. Peroxide cure systems can also be used. Generally, polymer compositions can be cross-linked by adding curative molecules, for example sulfur, metal oxides (e.g., zinc oxide), organometallic compounds, radical initiators, etc., followed by heating. In particular, the following are common curatives that may be used: ZnO, CaO, MgO, $Al_2O_3$, $CrO_3$, FeO, $Fe_2O_3$, and NiO. These metal oxides can be used in conjunction with the corresponding metal stearate complex (e.g., $Zn(stearate)_2$, $Ca(stearate)_2$, $Mg(stearate)_2$, and $Al(stearate)_3$), or with stearic acid, and a sulfur compound or an alkylperoxide compound.

Optionally, the curative can comprise an accelerator, which is any compound capable of acting as accelerator of the vulcanization of diene elastomers. The mechanism for accelerated vulcanization of the compositions comprising branched EPDM involves complex interactions between the curative, accelerator, activators, and polymers. Ideally, the entire available curative is consumed in the formation of effective crosslinks, which join together two polymer chains and enhance the overall strength of the polymer matrix.

Accelerators that may be used include, but are not limited to, amines, guanidines, thioureas, thiazoles, thiurams, sulfenamides, sulfenimides, thiocarbamates, xanthates, and the like, and combinations thereof. Specific accelerators include, but are not limited to, the following: stearic acid, diphenyl guanidine (DPG), tetramethylthiuram disulfide (TMTD), N'N-di-ortho-tolyl guanidine (DOTG), dipentamethylenethiuram tetrasulfide (DPTT), 4,4'-dithiodimorpholine (DTDM), tetrabutylthiuram disulfide (TBTD), 2-mercaptobenzthiazole (MBT), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), N-oxydiethylene thiocarbamyl-N-oxydiethylene sulfonamide (OTOS), zinc diethyldithiocarbamate (ZDEC), zinc 2-ethyl hexanoate (ZEH), N,N'-diethyl thiourea, and combinations thereof.

Curatives (including accelerators) can be included in compounds described herein at 5 phr to 50 phr, or alternatively 10 phr to 25 phr.

Foaming Agent

Chemical foaming agents can include, but are not limited to, organic foaming agents, such as 4,4'-oxybis benzene sulfonyl hydrazide; azodicarbonamide; azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic foaming agents such as ammonium bicarbonate and sodium bicarbonate. Specifically, the foaming agent can be 4,4'-oxybis benzene sulfonyl hydrazide (OBSH). A gas, such as air, nitrogen, carbon dioxide, etc., may also be injected into the composition during the injection molding process. Useful foaming agents can include those commercially available under the trade names CELOGEN™ (Chemtura Corporation, Philadelphia, Pa., USA), GENITRON™, POROFOR™, FICEL™ (Lanxess AG, Germany), SUVA™, DYMELT™, FORMACEL™, ZYRON™ (DuPont Chemical Company, Wilmington, Del., USA), and PLANAGEN™ (INBRA S.A., Brazil).

Foaming agents can be included in compounds described herein at 0.1 phr to 25 phr, or alternatively 0.5 phr to 10 phr.

EXAMPLE EMBODIMENTS

A first example embodiment is a compound comprising: 100 parts per hundred rubber (phr) of a branched ethylene propylene diene monomer (EPDM) elastomer comprising 35 wt % to 70 wt % ethylene derived units, 20 wt % to 64 wt % propylene derived units, and 1 wt % to 10 wt % diene derived units, wherein the EPDM elastomer has a Mooney viscosity (ML) (1+4) at 125° C. of 30 MU to 120 MU, a corrected Mooney relaxation area (cMLRA) at 80 ML of 300 MU·sec to 1000 MU·sec, and long chain branching (LCB) g' (vis) of 0.80 to 1.0; 75 phr to 200 phr of a filler; 25 phr to 125 phr of a processing oil; and 5 phr to 50 phr of a curative. This example embodiment can include one or more of the following: Element 1: wherein the branched EPDM has a number average molecular weight (Mn) of 35,000 g/mol to 125,000 g/mol; Element 2: wherein the branched EPDM has a weight average molecular weight (Mw) of 215,000 g/mol to 350,000 g/mol; Element 3: wherein the branched EPDM has a z-average molecular weight (Mz) of 375,000 g/mol to 1,000,000 g/mol; Element 4: wherein the branched EPDM has a Mn/Mw of 2.2.5 to 4.5; Element 5: wherein the compound has a Mooney ratio of 0.8 to 1.0; and Element 6: wherein the compound further comprises 0.1 phr to 25 phr of a foaming agent. Examples of combinations include, but are not limited to, two or more of Elements 1-4 in combination; Element 5 in combination with one or more of Elements 1-4; and Element 6 in combination with one or more of Elements 1-4.

Another example embodiment is a method comprising: producing a compound comprising: 100 parts per hundred rubber (phr) of a branched ethylene propylene diene monomer (EPDM) elastomer comprising 35 wt % to 70 wt % ethylene derived units, 20 wt % to 64 wt % propylene derived units, and 1 wt % to 10 wt % diene derived units, wherein the EPDM elastomer has a Mooney viscosity (ML) (1+4) at 125° C. of 30 MU to 120 MU, a corrected Mooney relaxation area (cMLRA) at 80 ML of 300 MU·sec to 1000 MU·sec, and long chain branching (LCB) g' (vis) of 0.80 to 1.0; 75 phr to 200 phr of a filler; 25 phr to 125 phr of a processing oil; and 5 phr to 50 phr of a curative; and vulcanizing the compound. This example embodiment can include one or more of the following: Element 1; Element 2; Element 3; Element 4; Element 5; Element 7: wherein the compound further comprises 0.1 phr to 25 phr of a foaming agent, and wherein the method further comprises foaming the compound; Element 8: the method further comprising: extruding the compound and forming an article; Element 9: Element 8 and wherein the article is an automotive weather seal, a non-automotive weather seal, or a building profile; Element 10: the method further comprising: molding the compound and forming an article; Element 11: Element 10 and wherein the article is a seal, a gasket, a hose, a roof sheet, a film, or a cable jacket. Examples of combinations include, but are not limited to, two or more of Elements 1-4 in combination; Element 5 in combination with one or more of Elements 1-4; Element 7 in combination with one or more of Elements 1-4; Element 8, optionally in combination with Element 9, in combination with one or more of Elements 1-5 and/or 7; and Element 10, optionally in combination with Element 11, in combination with one or more of Elements 1-5 and/or 7.

Yet another example embodiment is a method comprising: polymerizing ethylene monomers, propylene monomers, and diene monomers in the presence of 2-(8-anilino-5,6,7,8-tetrahydronaphthalen-1-yl)-N-(2,6-diisopropylphenyl) quinolin-8-amido hafnium dimethyl and dimethylanilinium tetrakis(pentafluorophenyl)borane to produce a branched ethylene propylene diene monomer (EPDM) elastomer comprising 35 wt % to 70 wt % ethylene derived units, 20 wt % to 64 wt % propylene derived units, and 1 wt % to 10 wt % diene derived units, wherein the EPDM elastomer has a Mooney viscosity (ML) (1+4) at 125° C. of 30 MU to 120 MU, a corrected Mooney relaxation area (cMLRA) at 80 ML of 300 MU·sec to 1000 MU·sec, and long chain branching (LCB) g' (vis) of 0.80 to 1.0. This example embodiment can include one or more of the following: Element 1; Element 2; Element 3; Element 4; and Element 5.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Complex 1, which is a specific version of formula (I) above, is 2-(8-anilino-5,6,7,8-tetrahydronaphthalen-1-yl)-N-(2,6-diisopropylphenyl) quinolin-8-amido hafnium dimethyl, was prepared as described below.

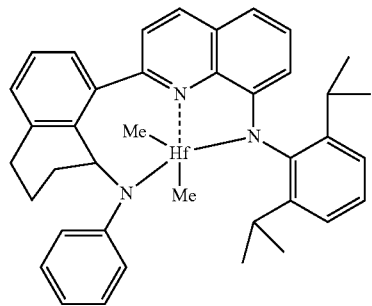

The activator used was dimethylanilinium tetrakis(pentafluorophenyl)borane (available from W.R. Grace & Co. or Boulder Scientific).

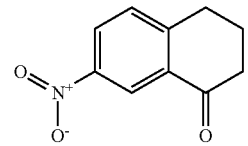 [SMILES: O=C1CCCc2ccc([N+](=O)[O-])cc21]

To 900 ml of cold 98% sulfuric acid 132 g (900 mmol) of 3,4-dihydronaphthalen-1(2H)-one was added dropwise for 30 min at −10° C. Then, a solution of 137 g (1.35 mol) KNO$_3$ in 450 ml of 98% sulfuric acid was added dropwise to the above mixture for 2 h at −10° C., and the resulting mixture was stirred for 30 min at this temperature. Further on, the resulting mixture was poured into the mixture of 4 kg of crushed ice and 4 L of cold water. Then, the obtained yellowish precipitate was filtered off and washed with water (5×800 ml) and 400 ml of EtOH. The precipitate was air-dried overnight under the fume hood to give 146 g of a ca. 4:1 mixture of 7-nitro-3,4-dihydronaphthalen-1(2H)-one and 5-nitro-3,4-dihydronaphthalen-1(2H)-one. Further on, it was re-crystallized from 900 ml of i-PrOH to afford pure 7-nitro-3,4-dihydronaphthalen-1(2H)-one. Yield 73.0 g (42%) of a dark brown crystalline solid. $^1$H NMR (CDCl$_3$): δ 8.82 (s, 1H, 8-H); 8.27 (d, J=8.4 Hz, 1H, 6-H); 7.44 (d, J=8.2 Hz, 1H, 5-H), 3.07 (t, J=5.8 Hz, 2H, 4,4'-H); 2.72 (t, J=6.1 Hz, 2H, 2,2'-H); 2.08 (m, 2H, 3,3'-H).

Preparation of
7-Amino-3,4-dihydronaphthalen-1(2H)-one

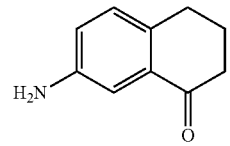 [SMILES: Nc1ccc2c(c1)C(=O)CCC2]

To a solution of 73.0 g (380 mmol) of 7-nitro-3,4-dihydronaphthalen-1(2H)-one in 1700 ml of 95% EtOH 430 g (1.91 mol) of SnCl$_2$*H$_2$O was added in one portion. The resulting mixture was refluxed for 2 h. Then, a solution of 180 g of NaOH in 1800 ml of water was added portionwise to give a yellow suspension (pH=8-9). Further on, this suspension was divided into two parts, and each of them was extracted with ether (3×300 ml). The combined organic extracts were evaporated to dryness, and the residue was dissolved in 1000 ml of ether. The resulting dark solution was washed with water, dried over Na$_2$SO$_4$, and passed through a silica gel pad (250 ml). The obtained elute was evaporated to dryness to give 45.1 g (74%) of a dark red crystalline solid. $^1$H NMR (DMSO-d6): δ 7.08 (s, 1H, 8-H); 7.00 (d, J=8.0 Hz, 1H, 5-H); 6.78 (d, J=8.1 Hz, 1H, 6-H), 5.15 (s, 2H, —NH$_2$), 2.75 (m, 2H, 4,4'-H); 2.51 (m, 2H, 2,2'-H); 1.96 (m, 2H, 3,3'-H).

Preparation of 7-Amino-8-bromo-3,4-dihydronaphthalen-1(2H)-one

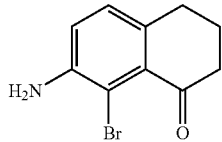

To a solution of 45.1 g (280 mmol) of 7-amino-3,4-dihydronaphthalen-1(2H)-one in 500 ml of N,N-dimethylformamide a solution of 47.3 g (270 mmol) of N-bromosuccinimide in 300 ml of N,N-dimethylformamide was added dropwise for 3 h at 0° C. The resulting mixture was stirred for 1 h and then poured into 1 L of water. The crude product was extracted with dichloromethane (3×300 ml), and the combined extract was washed with water (3×500 ml). Further on, the organic phase was dried over $Na_2SO_4$, passed through a silica gel pad (100 ml), and the elute was evaporated to dryness to give a ca. 11:1 mixture of 7-amino-8-bromo-3,4-dihydronaphthalen-1(2H)-one and 7-amino-6-bromo-3,4-dihydronaphthalen-1(2H)-one as a dark viscous oil. This mixture was dissolved in 230 ml of 95% EtOH. Crystalline product precipitated from this solution at −30° C. was collected and dried in vacuum. Yield 46.4 g (69%) of a dark red crystalline solid. $^1$H NMR (CDCl$_3$): 6.98 (d, J=8.2 Hz, 1H, 5-H); 6.86 (d, J=8.2 Hz, 1H, 6-H), 4.30 (br. s, 2H, —NH$_2$), 2.84 (m, 2H, 4,4'-H); 2.64 (m, 2H, 2,2'-H); 2.04 (m, 2H, 3,3'-H).

Preparation of 8-Bromo-3,4-dihydronaphthalen-1(2H)-one

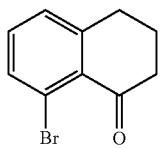

To 600 ml of cold 4M HCl 46.4 g (193 mmol) 7-amino-8-bromo-3,4-dihydronaphthalen-1(2H)-one was added in one portion at 3° C. Further on, a solution of 14.7 g (212 mmol) of NaNO$_2$ in 100 ml of water was added dropwise for 1 h at this temperature. Then, 200 ml of H$_3$PO$_2$ (50% in water) was added dropwise for 30 min at 5° C. The resulting mixture was diluted with 500 ml of water, and the crude product was extracted with dichloromethane (3×300 ml). The combined extract was dried over Na$_2$SO$_4$, passed through a silica gel pad (100 ml), the elute was evaporated to dryness. The residue was washed with small portion of n-hexane and then dried in vacuum. Yield 33.9 g (78%) of a dark red crystalline solid. $^1$H NMR (CDCl$_3$): δ 7.53 (m, 1H, 7-H); 7.18-7.22 (m, 2H, 5,6-H); 2.95 (t, J=6.1 Hz, 2H, 4,4'-H); 2.67 (t, J=6.6 Hz, 2H, 2,2'-H); 2.08 (quint, J=6.1 Hz, J=6.6 Hz, 2H, 3,3'-H).

Preparation of (8-Bromo-1,2,3,4-tetrahydronaphthalen-1-yl)phenylamine

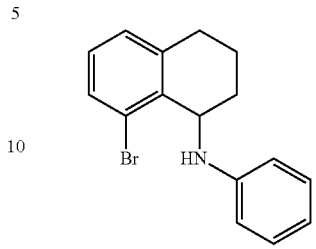

To a stirred solution of 57.7 g (620 mmol) of aniline in 1500 ml of toluene a solution of 28.5 g (150 mmol) of TiCl$_4$ in 150 ml of toluene was added dropwise for 30 min at room temperature under argon atmosphere. The resulting mixture was stirred for 30 min at 90° C. followed by addition of 13.1 g (150 mmol) of 8-bromo-3,4-dihydronaphthalen-1(2H)-one. This mixture was stirred for 30 min at 90° C., then cooled to room temperature, and poured into 500 ml of water. The product was extracted with 3×50 ml of ethyl acetate. The combined organic extract was dried over Na$_2$SO$_4$, evaporated to dryness, and the residue was re-crystallized from 30 ml of ethyl acetate. The obtained crystalline solid was dissolved in 200 ml of methanol, 9.24 g (147 mmol) of NaBH$_3$CN and 3 ml of acetic acid were added under argon atmosphere. This mixture was refluxed for 3 h, then cooled to room temperature, and evaporated to dryness. The residue was diluted with 200 ml of water, and the crude product was extracted with 3×100 ml of ethyl acetate. The combined organic extract was dried over Na$_2$SO$_4$, and evaporated to dryness. Yield 30.0 g (65%) of a yellow oil. $^1$H NMR (CDCl$_3$): δ 7.44 (m, 1H), 7.21 (m, 2H), 7.05-7.11 (m, 2H), 6.68-6.73 (m, 3H), 4.74 (m, 1H), 3.68 (br.s, 1H, NH), 2.84-2.89 (m, 1H), 2.70-2.79 (m, 1H), 2.28-2.32 (m, 1H), 1.85-1.96 (m, 1H), 1.76-1.80 (m, 1H), 1.58-1.66 (m, 1H).

Preparation of N-Phenyl-8-(4,4,5,5-tetramethyl-1,3,2-dioxaborolan-2-yl)-1,2,3,4-tetrahydronaphthalen-1-amine

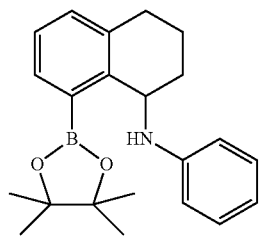 [SMILES: CC1(C)OB(c2cccc3c2C(Nc2ccccc2)CCC3)OC1(C)C]

To a solution of 37.6 g (124 mmol) of (8-bromo-1,2,3,4-tetrahydronaphthalen-1-yl)phenylamine in 1000 ml THF 49.7 ml (124 mmol) of 2.5 M $^t$BuLi was added at −80° C. Further on, this mixture was stirred for 1 h at this temperature, and 137 ml (260 mmol) of 1.9 M $^t$BuLi in pentane was added. The resulting mixture was stirred for 1 h at the same temperature. Then, 48.4 g (260 mmol) of 2-isopropoxy-4,4,5,5-tetramethyl-1,3,2-dioxaborolane was added. After that the cooling bath was removed, and the resulting mixture was stirred for 1 h at room temperature. Finally, 50 ml of water was added, and the obtained mixture was evaporated to dryness. The residue was diluted with 500 ml of water, and the crude product was extracted with 3×300 ml of ethyl acetate. The combined organic extract was dried over Na$_2$SO$_4$ and then evaporated to dryness. Yield 43.3 g (quant.) of a red oil. $^1$H NMR (CDCl$_3$): δ 7.59 (m, 1H), 7.18-7.23 (m, 4H), 6.71-6.74 (m, 3H), 5.25 (m, 1H), 3.87 (br.s, 1H, NH), 2.76-2.90 (m, 2H), 2.12-2.16 (m, 1H), 1.75-1.92 (m, 3H), 1.16 (s, 6H), 1.10 (s, 6H).

Preparation of 8-(2,6-Diisopropylphenylamino)quinolin-2(1H)-one

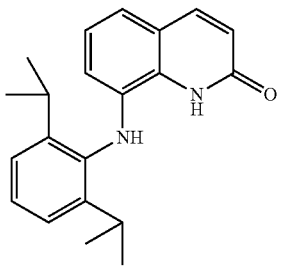 [SMILES: CC(C)c1cccc(C(C)C)c1Nc1cccc2ccc(=O)[nH]c12]

To a suspension of 5.63 g (140 mmol, 60% wt. in mineral oil) of NaH in 1000 ml of dry THF 30.0 g (134 mmol) of 8-bromoquinolin-2(1H)-one was added in small portions at 0° C. After addition was completed, the reaction mixture was warmed to and stirred at room temperature for 30 min. The solution obtained was cooled to 0° C., and 20.2 g (134 mmol) of tert-butyl-dimethylsilylchloride (TBDMSCl) was added in one portion. After 30 min of stirring at room temperature the resulting mixture was poured into 1000 ml of water. The protected 8-bromoquinolin-2(1H)-one was extracted with 3×400 ml of diethyl ether. The combined extract was dried over Na$_2$SO$_4$ and then evaporated to dryness. Yield 45.2 g (quant., 99% purity by GC/MS) of a dark red oil. To a solution of 27.7 ml (147 mmol) of 2,6-diisopropylaniline in 1500 ml of dry toluene n-butyl-lithium (60.5 ml, 147 mmol, 2.5 M in hexanes) was added at room temperature. The obtained suspension was heated to 100° C. and then cooled to room temperature. To the reaction mixture 2.45 g (2.68 mmol) of Pd$_2$(dba)$_3$ (dba=dibenzylideneacetone) and 2.55 g (5.36 mmol) of 2-dicyclohexylphosphino-2',4',6'-triisopropylbiphenyl (XPhos) were subsequently added followed by an addition of 45.2 g (134 mmol) of protected 8-bromoquinolin-2(1H)-one. The formed dark brown suspension was heated at 60° C. until lithium salt precipitate disappeared (~30 min). The resulting dark red solution was quenched by 100 ml of water, the organic layer was separated, dried over Na$_2$SO$_4$, and then evaporated to dryness. The oily residue obtained was dissolved in a mixture of 1000 ml of dichloromethane and 500 ml of methanol, followed by an addition of 50 ml of 12 M hydrochloric acid. The reaction mixture was stirred at room temperature for 3 h, then poured into 2000 ml of 5% K$_2$CO$_3$. The product was extracted with 3×700 ml of dichloromethane. The combined extract was dried over Na$_2$SO$_4$ and then evaporated to dryness. The resulting solid was triturated with 300 ml of n-hexane, and thus obtained suspension was filtered off on a glass frit (G3). The precipitate was dried in vacuum. Yield 29.0 g (67%) of a marsh-green solid. $^1$H NMR (CDCl$_3$): δ 13.29 (br.s, 1H), 7.80-7.81 (d, 1H, J=9.5 Hz), 7.35-7.38 (m, 1H), 7.29-7.30 (m, 3H), 6.91-6.95 (m, 2H), 6.58-6.60 (d, 1H, J=9.5 Hz), 6.27-6.29 (m, 1H), 3.21 (sept, 2H, J=6.9 Hz), 1.25-1.26 (d, 6H, J=6.9 Hz), 1.11-1.12 (d, 6H, J=6.9 Hz).

Preparation of 2-Chloro-N-(2,6-diisopropylphenyl)quinolin-8-amine

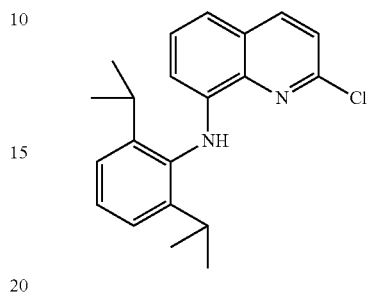

29.0 g (90.6 mmol) of 8-(2,6-diisopropylphenylamino)quinolin-2(1H)-one was added to 400 ml of phosphorus oxychloride in one portion. The resulting suspension was heated at 105° C. for 40 h, then cooled to room temperature, and poured into 4000 cm$^3$ of a crushed ice. The product was extracted with 3×400 ml of diethyl ether. The combined extract was dried over K$_2$CO$_3$ and then evaporated to dryness. The resulting solid was triturated with 30 ml of cold n-hexane, and the obtained suspension was filtered through glass frit (G3). The obtained precipitate was dried in vacuum. Yield 29.0 g (95%) of a yellow-green solid. $^1$H NMR (CDCl$_3$): δ 8.04-8.05 (d, 1H, J=8.6 Hz), 7.38-7.39 (d, 1H, J=8.5 Hz), 7.33-7.36 (m, 1H), 7.22-7.27 (m, 4H), 7.04-7.06 (d, 1H, J=8.1 Hz), 6.27-6.29 (d, 1H, J=7.8 Hz), 3.20 (sept, 2H, J=6.9 Hz), 1.19-1.20 (d, 6H, J=6.9 Hz), 1.10-1.11 (d, 6H, J=6.9 Hz).

Preparation of 2-(8-Anilino-5,6,7,8-tetrahydronaphthalen-1-yl)-N-(2,6-diisopropylphenyl)quinolin-8-amine

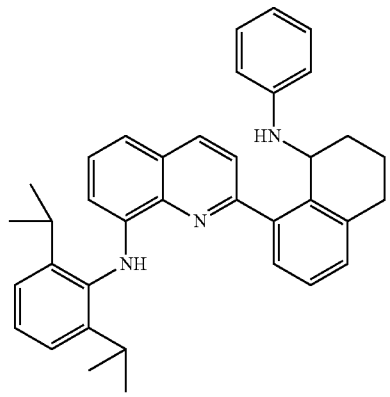 [SMILES: CC(C)c1cccc(C(C)C)c1Nc1cccc2ccc(-c3cccc4c3C(Nc3ccccc3)CCC4)nc12]

To a solution of 37.5 g (110 mmol) of 2-chloro-N-(2,6-diisopropylphenyl)quinolin-8-amine in 1500 ml of 1,4-dioxane 39.5 g (113 mmol) of N-phenyl-8-(4,4,5,5-tetramethyl-1,3,2-dioxaborolan-2-yl)-1,2,3,4-tetrahydronaphthalen-1-amine, 89.5 g (275 mmol) of cesium carbonate, and 800 ml of water were subsequently added. The obtained mixture was purged with argon for 10 min followed by an addition of 6.36 g (5.50 mmol) of Pd(PPh$_3$)$_4$. This mixture was stirred for 2 h at 90° C., then cooled to room temperature. To the obtained two-phase mixture 1000 ml of n-hexane was added. The organic layer was separated, washed with brine, dried over Na$_2$SO$_4$, passed through a short pad of silica gel 60 (to remove traces of triphenylphosphine oxide), and then evaporated to dryness. The residue was re-crystallized from 450 ml of n-hexane. Yield 45.4 g (78%) of a lemon-yellow powder. Anal. calc. for C$_{37}$H$_{39}$N$_3$: C, 84.53; H, 7.48; N, 7.99. Found: C, 84.70; H, 7.33; N, 8.15. $^1$H NMR (CDCl$_3$): δ 7.88 (d, J=8.3 Hz, 1H), 7.60 (s, 1H), 7.47 (d, J=8.4 Hz, 1H), 7.34-7.42 (m, 3H), 7.25-7.34 (m, 3H), 7.16 (t, J=7.8 Hz, 1H), 6.91 (d, J=8.1 Hz, 1H), 6.77 (t, J=7.6 Hz, 2H), 6.39 (t, J=7.2 Hz, 1H), 6.24 (d, J=7.6 Hz, 1H), 6.18 (d, J=8.1 Hz, 2H), 5.39 (br. s., 1H), 3.59 (br. s., 1H), 3.35-3.51 (m, 1H), 3.23-3.33 (m, 1H), 2.95-3.07 (m, 1H), 2.85-2.95 (m, 1H), 2.15 (d, J=12.3 Hz, 1H), 1.88-1.99 (m, 1H), 1.77-1.88 (m, 2H), 1.22-1.41 (m, 6H), 1.12-1.21 (m, 6H).

Preparation of Complex 1

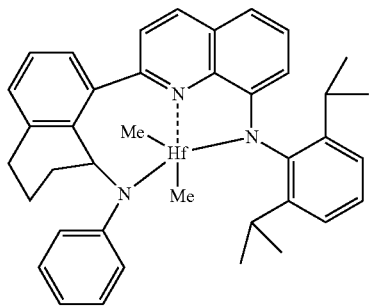

Toluene (80 mL) was added to 2-(8-anilino-5,6,7,8-tetrahydronaphthalen-1-yl)-N-(2,6-diisopropylphenyl)quinolin-8-amine (5.500 g, 10.46 mmol) and Hf(NMe2)4 (3.865 g, 10.89 mmol) to form a clear orange solution after stirring for a few minutes. The mixture was placed on a metal block that was then warmed to 85° C. After 21 hours the solution was clear and red tinted. The flask was allowed to cool to near ambient temperature and AlMe3 (5.279 g, 73.23 mmol) was added. The mixture became a darker red. After 7 hours the volatiles were removed overnight by evaporation with a stream of nitrogen. The resulting orange solid was crushed with a spatula and toluene (5 mL) was added to form a slurry. The slurry was stirred for 30 minutes then pentane (60 mL) was added. The suspension was stirred for 3 hours. The solid was then collected on a frit and washed with cold pentane (2×30 mL) to afford the product as an orange solid. Yield: 6.93 g, 90.5%.

Preparation of isobutyldi(dec-9-en-1-yl)aluminum, iBuAl(Dec=)2 (AVTA)

1,9-Decadiene (500 mL, 2.71 mol) was loaded into a round-bottomed flask. Diisobutylaluminum hydride (30.2 mL, 0.170 mol) was added dropwise over 15 minutes. The mixture was then placed in a metal block maintained at 110° C. After 30 minutes the solution had stabilized at a temperature of 104° C. The mixture was kept at this temperature for an additional 135 minutes at which time H-NMR spectroscopic data indicated that the reaction had progressed to the desired amount. The mixture was cooled to ambient temperature. The excess 1,9-decadiene was removed by vacuum distillation at 44° C./120 mTorr over a 2.5 hours. The product was further distilled at 50° C./120 mTorr for an additional hour to ensure complete removal of all 1,9-decadiene. The isolated product was a clear colorless oil. The yield was 70.9 g. H-NMR spectroscopic data indicated an average formula of Al(iBu)0.9(decenyl)2.1, with a small amount (ca. 0.2 molar equivalents) of vinylidene containing byproduct, that may be formed by the insertion of 1,9-decadiene into an Al-octenyl bond followed by beta hydride elimination.

Polymerization

All branched EPDM elastomers were produced using a solution process in a 1.0-liter continuous stirred-tank reactor (autoclave reactor). The autoclave reactor was equipped with a stirrer, a water-cooling/steam-heating element with a temperature controller, and a pressure controller. Solvents and monomers were purified by passing through purification columns packed with molecular sieves.

Isohexane (solvent) was passed through four columns in series whereas ethylene, propylene, and toluene were each purified by passing through two columns in series. Purification columns are regenerated periodically (twice/year) or whenever there is evidence of low catalyst activity. ENB was purified in a glove box by passing through a bed of basic alumina under a steady nitrogen gas purge. Aluminum Vinyl Transfer Agent (AVTA) solution was diluted to a concentration of 3.38×10$^{-6}$ mol/ml using isohexane. Isohexane and AVTA solutions were fed using Pulsa pumps and their flow rate was controlled using a pump calibration curve. Purified propylene, and ENB were also fed using Pulsa pumps but their flow rate was controlled using mass-flow controllers. The feed rate of purified ethylene was also regulated using a mass flow controller. Ethylene and propylene combined into a single line before entering a manifold upstream of the reactor. Isohexane, AVTA solution, and ethylene norbornene (ENB) solution lines also combined in a single line before entering the same manifold. The resulting two lines merged further downstream and the combined mixture of monomers and solvent was fed into the reactor using a single tube.

Catalyst used was Complex 1 activated by N,N-dimethylanilinium-tetrakis(pentafluorophenyl) borate. Catalyst solution was prepared daily and used on the same day. The solution was prepared by dissolving 80 mg of Complex 1 and 90.7 mg of N,N-dimethylanilinium tetrakis(pentafluorophenyl)borate in 900 ml toluene (catalyst concentration=1.233×10$^{-1}$ mol/ml, pre-catalyst/activator (molar ratio)= 0.98). This solution was pumped into the reactor through a designated dip-tube at a desired rate using an Isco pump. Composition was controlled by adjusting the feed ratio of the monomers.

Irganox 1076 was added to the polymer samples as they were collected from the reactor. The polymer samples were then placed on a boiling-water steam table in a hood to evaporate a large fraction of the solvent and unreacted monomers, and then, dried in a vacuum oven at a temperature of about 90° C. for about 12 hours. The vacuum oven dried samples were weighed to obtain yields. The ethylene and ENB content of the polymer was determined by FTIR. The monomer conversions were calculated using the polymer yield, composition and the amount of monomers fed into the reactor. Catalyst activity (also referred as to catalyst productivity) was calculated based the yield and the feed rate of catalyst. All the reactions were carried out at a gauge pressure of about 2.2 MPa. Melt flow rate (MFR) measurements were made as a proxy for molecular weight for the EP copolymers whereas; Mooney measurements were made to gauge the molecular weight and long-chain branching of the branched EPDM terpolymers. The branched EPDM polymers made can be found in Tables 2A-2C and their compositions and molecular weights can be found in Tables 3A-3C.

TABLE 2A

| Example # | EPDM1 | EPDM2 | EPDM3 | EPDM4 | EPDM5 | EPDM6 |
|---|---|---|---|---|---|---|
| Reactor Temp (° C.) | 100 | 100 | 100 | 100 | 100 | 100 |
| Ethylene Feed (g/min) | 1.8 | 1.8 | 2.7 | 2.7 | 2.7 | 2.7 |
| Propylene Feed (g/min) | 7 | 7 | 7 | 7 | 7 | 7 |
| ENB Feed (g/min) | 0.4 | 0.4 | 0.8 | 0.8 | 1.11 | 1.11 |
| Catalyst 2 Feed (mol/min) | $2.47 \times 10^{-7}$ | $2.47 \times 10^{-7}$ | $2.47 \times 10^{-7}$ | $2.47 \times 10^{-7}$ | $2.47 \times 10^{-7}$ | $2.47 \times 10^{-7}$ |
| AVTA4 Feed (mol/min) | $2.82 \times 10^{-5}$ | $1.69 \times 10^{-5}$ | $3.38 \times 10^{-5}$ | $2.03 \times 10^{-5}$ | $3.38 \times 10^{-5}$ | $2.03 \times 10^{-5}$ |
| Isohexane Feed (g/min) | 64.5 | 61.9 | 64.8 | 62.2 | 65.1 | 62.4 |
| Residence Time (min) | 7.6 | 7.8 | 7.4 | 7.7 | 7.4 | 7.6 |
| Polymer Content (wt %) | 5.10 | 5.35 | 5.54 | 6.18 | 4.90 | 5.06 |
| Catalyst Efficiency (g polymer/gcat) | 14929 | 12300 | 16999 | 16723 | 11913 | 15396 |
| C2 (wt %) uncorrected-FTIR | 42.8 | 42.5 | 56 | 56 | 57.2 | 57.3 |
| ENB (wt %)-FTIR | 2.4 | 2.4 | 4.4 | 4.9 | 6.1 | 6.1 |
| MF (mu) | 51.1 | 77.2 | 95.8 | 145.3 | 92.7 | 142.6 |
| MFRA (mu-sec) | 202.5 | 405.4 | 630.9 | 1391.1 | 559.5 | 1251.1 |
| cMFRA (mu-sec) | 386 | 427 | 487 | 589 | 453 | 544 |

TABLE 2B

| Example # | EPDM7 | EPDM8 | EPDM9 | EPDM10 | EPDM11 |
|---|---|---|---|---|---|
| Reactor Temp (° C.) | 100 | 100 | 100 | 100 | 100 |
| Ethylene Feed (g/min) | 2.7 | 2.7 | 2.6 | 2.7 | 2.6 |
| Propylene Feed (g/min) | 7 | 7 | 7 | 7 | 7 |
| ENB Feed (g/min) | 1.11 | 1.11 | 1.11 | 1.11 | 1.11 |
| Catalyst 2 Feed (mol/min) | $2.47 \times 10^{-7}$ | $2.47 \times 10^{-7}$ | $2.47 \times 10^{-7}$ | $2.47 \times 10^{-7}$ | $2.47 \times 10^{-7}$ |
| AVTA4 Feed (mol/min) | $3.38 \times 10^{-5}$ | $2.03 \times 10^{-5}$ | $3.38 \times 10^{-5}$ | $2.03 \times 10^{-5}$ | $2.03 \times 10^{-5}$ |
| Isohexane Feed (g/min) | 65.1 | 62.4 | 46.3 | 28.7 | 43.7 |
| Residence Time (min) | 7.4 | 7.6 | 9.6 | 13.5 | 10.1 |
| Polymer Content (wt %) | 4.93 | 4.40 | 4.90 | — | 6.94 |
| Catalyst Efficiency (g polymer/gcat) | 12402 | 10504 | 9324 | 16880 | 15829 |
| C2 (wt %) uncorrected-FTIR | 59.8 | 61.8 | 59.2 | 57.1 | 55.8 |
| ENB (wt %)-FTIR | 5.6 | 5.9 | 5.7 | 6.2 | 6.2 |
| ML (mu) | 35.1 | 56.5 | 41 | 97.4 | 80 |
| MLRA (mu-sec) | 141.5 | 265.1 | 301.5 | 1068.9 | 518.2 |
| cMLRA (mu-sec) | 463 | 437 | 789 | 805 | 518 |

TABLE 2C

| Example # | EPDM12 | EPDM13 | EPDM14 | EPDM15 | EPDM16 |
|---|---|---|---|---|---|
| Reactor Temp (° C.) | 100 | 110 | 110 | 110 | 110 |
| Ethylene Feed (g/min) | 2.6 | 2.6 | 2.6 | 2.6 | 2.6 |
| Propylene Feed (g/min) | 7 | 7 | 7 | 7 | 7 |
| ENB Feed (g/min) | 1.11 | 1.11 | 1.11 | 1.02 | 0.93 |
| Catalyst 2 Feed (mol/min) | $2.47 \times 10^{-7}$ | $2.47 \times 10^{-7}$ | $2.47 \times 10^{-7}$ | $2.47 \times 10^{-7}$ | $2.47 \times 10^{-7}$ |
| AVTA4 Feed (mol/min) | $2.03 \times 10^{-5}$ | $3.69 \times 10^{-5}$ | $3.69 \times 10^{-5}$ | $3.67 \times 10^{-5}$ | $3.67 \times 10^{-5}$ |
| Isohexane Feed (g/min) | 34.7 | 34.7 | 28.7 | 34.6 | 34.6 |
| Residence Time (min) | 11.9 | 11.9 | 13.6 | 12.0 | 12.0 |
| Polymer Content (wt %) | 8.54 | 10.05 | 12.61 | 7.39 | 6.50 |
| Catalyst Efficiency (g polymer/gcat) | 16751 | 16751 | 18446 | 15410 | 12415 |

TABLE 2C-continued

| Example # | EPDM12 | EPDM13 | EPDM14 | EPDM15 | EPDM16 |
|---|---|---|---|---|---|
| C2 (wt %) uncorrected-FTIR | 50.9 | 56.5 | 55.3 | 57.2 | 57.8 |
| ENB (wt %)-FTIR | 6.4 | 6.7 | 6.5 | 6.4 | 5.3 |
| ML (mu) | 76.6 | 87.5 | 90.9 | 85.3 | 74.3 |
| MLRA (mu-sec) | 561.5 | 678.1 | 881.5 | 651.7 | 521.2 |
| cMLRA (mu-sec) | 598 | 596 | 733 | 594 | 580 |

TABLE 3A

| Example # | EPDM1 | EPDM2 | EPDM3 | EPDM4 | EPDM5 | EPDM6 |
|---|---|---|---|---|---|---|
| Mn-IR | 69,400 | 91,200 | 86,000 | 109,700 | 81,200 | 108,300 |
| Mw-IR | 187,700 | 241,600 | 241,700 | 310,500 | 230,600 | 293,000 |
| Mz-IR | 430,000 | 531,600 | 600,600 | 753,400 | 596,600 | 696,300 |
| PDI | 2.71 | 2.65 | 2.81 | 2.83 | 2.84 | 2.71 |
| C2 % (IR) | 40.93 | 36.91 | 53.4 | 52.6 | 54.8 | 55.0 |
| LCB g' | 0.942 | 0.938 | 0.904 | 0.933 | 0.914 | 0.94 |
| C2 % (NMR) | 45.4 | 44.4 | 59.2 | 59.0 | 60.7 | 62.5 |

TABLE 3B

| Example # | EPDM7 | EPDM8 | EPDM9 | EPDM10 | EPDM11 |
|---|---|---|---|---|---|
| Mn-IR | 49,500 | 64,000 | 50,000 | 77,900 | 75,700 |
| Mw-IR | 141,500 | 173,400 | 153,000 | 288,000 | 229,000 |
| Mz-IR | 445,600 | 484,600 | 568,400 | 911,300 | 617,800 |
| PDI | 2.86 | 2.71 | 3.06 | 3.70 | 3.03 |
| C2 % (IR) | 58.0 | 58.2 | 61.1 | 56.4 | 52.5 |
| LCB g' | 0.909 | 0.891 | 0.874 | 0.85 | 0.917 |
| C2 % (NMR) | 63.4 | 65.0 | 67.9 | 63.4 | — |

TABLE 3C

| Example # | EPDM12 | EPDM13 | EPDM14 | EPDM15 | EPDM16 |
|---|---|---|---|---|---|
| Mn-IR | 72,700 | 78,600 | 79,300 | 75,100 | 68,200 |
| Mw-IR | 233,500 | 267,800 | 290,800 | 243,400 | 214,600 |
| Mz-IR | 674,600 | 783,200 | 889,500 | 698,000 | 652,700 |
| PDI | 3.23 | 3.41 | 3.67 | 3.24 | 3.15 |
| C2 % (IR) | 51.8 | 52.0 | 50.9 | 52.9 | 58.85 |
| LCB g' | 0.895 | 0.878 | 0.856 | 0.907 | 0.897 |
| C2 % (NMR) | 60.1 | 60.7 | 60.0 | 60.3 | 63.0 |

Table 4 provides additional characteristics of EPDM14 and comparative polymers used in additional compound examples below. The reference polymer VISTALON™ 7500 has a Mooney Viscosity (1+4) 125° C. of 91, ethylene content of 56 wt % and ENB content of 5.7 wt %. VISTALON™ 8600 has a similar level of long chain branching as VISTALON™ 7500, but a higher ENB level. This polymer is mainly used for automotive sponge profile applications. VISTALON™ 6602 is a metallocene bi-modal molecular weight EPDM and Sample E is the T-branch polymer made through in-situ incorporation of vinyl terminated macromers. The AVTA sample has Mooney viscosity and ethylene content very similar to VISTALON™ 7500 but a marginally higher ENB content.

TABLE 4

| EPDM | ML (1 + 4) at 125° C. (MU) | cMLRA at 80 ML (MU · sec) | Ethylene Content (%) | ENB Content (%) |
|---|---|---|---|---|
| EPDM14 | 94 | 975 | 55.3 | 6.4 |
| VISTALON ™ 7500 (V7500) | 91 | 656 | 56.0 | 5.7 |
| VISTALON ™ 6602 (V6602) | 80 | 330 | 55.0 | 5.2 |
| VISTALON ™ 8600 (V8600) | 90 | 802 | 58.0 | 8.9 |
| Sample E | 57 | 471 | 56.6 | 6.0 |

Compounds

EPDM compound formulations containing carbon black, oil, and curatives were prepared in a 410 cc BANBURY® Mixer. Table 5 shows the representative compound formulation. A conventional mix was adopted for compounding using a fill factor of 70%. At the start of the mix, the chamber was filled with polymer. Carbon black, oil, zinc oxide, and stearic acid were added gradually to the mixer. After the mix had homogenized, the mixing speed was reduced to 80 rpm to control the temperature. Mixing was continued for 3 minutes, after which the batch was discharged from the BANBURY® mixer. The temperature of the discharged batch on an average was about 140° C. About 5 gm of the compound masterbatch was isolated for rheology measurements.

TABLE 5

| Component | Amount (phr) |
|---|---|
| First Pass in BANBURY ® mixer | |
| Polymer | 100 |
| Black N550 | 130 |
| SUNPAR ™ 2280 | 70 |
| Zinc oxide | 5 |
| Stearic acid | 1 |
| Sulfur | 0.10 |
| Second Pass in mill | |
| Sulfur | 1.10 |
| ZBEC (70% active) | 1.50 |
| MBTS (80% active) | 1.50 |
| RHENOCURE ™ ZADT/G (50% active) | 1.54 |
| RHENOCURE ™ TP/G (50% active) | 1.80 |

FIG. 1 shows the Mooney Ratio for the inventive polymer and the corresponding VISTALON™ control samples. The Mooney Ratio is defined as the ratio of compound Mooney Viscosity (1+4) measured at 100° C. to the polymer Mooney Viscosity (1+4) measured at 125° C. A lower Mooney ratio is indicative of increased branching level in the polymer for polymer samples that contain hyper branches. As seen in FIG. 1, the compound containing the EPDM14 polymer has the same Mooney ratio as the compound with VISTALON™ 7500. The formulation containing VISTALON™ 6602 (bimodal) and Sample E (T-branch) have higher Mooney ratio compared to the compound containing the EPDM14 polymer. A lower Mooney ratio is desirable for compound applications, as it enables extension to higher phr without significant increase in compound viscosity.

Figure 2:
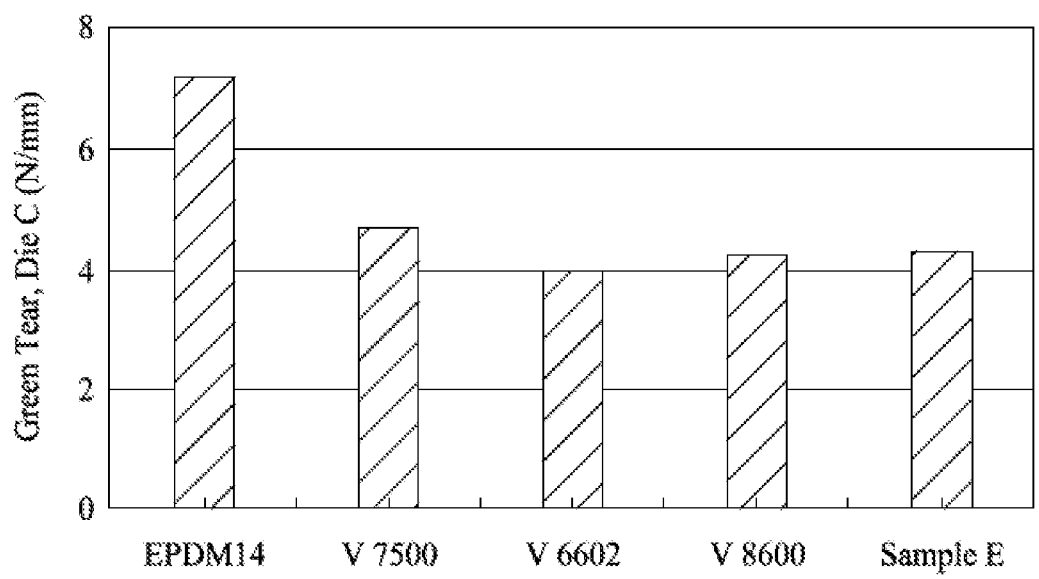
FIG. 2 shows the green (uncured) Tear (Die C) of the various formulations.

FIG. 2 shows the green (uncured) Tear (Die C) of the various formulations. The green tear for the compound containing the EPDM14 polymer is significantly higher than rest of the formulations. Higher green tear is beneficial for mill handling.

Table 6 shows the compound properties of the formulations based on the polymer sample shown in Table 3. Small Angle Oscillatory Shear (SAOS) measurements were carried out using the ATD® 1000 Rubber Process Analyzer from Alpha Technologies. A sample of approximately 5.4 gm weight is mounted between the parallel plates of the ATD® 1000. The test temperature is 100° C., the applied strain is 14% and the frequency was varied from 0.1 rad/s to 200 rad/s. The complex modulus (G*), complex viscosity ($\eta$*) and the phase angle ($\delta$) are measured at each frequency. The compound tan $\delta$ (measured at 0.245 rad/s) is the lowest for the sample containing the EPDM14 polymer. Lower tan $\delta$ values represent higher compound elastic modulus, which is controlling factor governing dimensional stability of the profile during extrusion and vulcanization. The compound cure and physical properties of the compound containing the EPDM14 sample is comparable to the VISTALON™ 7500 compound.

TABLE 6

| Example | 1 | 2 | 3 | 4 | 5 |
|---|---|---|---|---|---|
| EPDM | EPDM14 | V7500 | V6602 | V8600 | Sample E |
| Compound ML (1 + 4) 100° C. (MU) | 81 | 79 | 85 | 73 | 76 |
| Polymer ML (1 + 4) 125° C. (MU) | 94 | 91 | 80 | 90 | 57 |
| Compound ML/ Polymer ML | 0.87 | 0.87 | 1.06 | 0.81 | 1.33 |
| SAOS 100 C., 14% Strain | | | | | |
| Tan Delta @ 0.245 Rad/s | 0.65 | 0.68 | 0.96 | 0.79 | 0.81 |
| Viscosity @ 0.245 rad/s (Pa · sec) | $7.1 \times 10^5$ | $5.6 \times 10^5$ | $7.3 \times 10^5$ | $4.6 \times 10^5$ | $5.6 \times 10^5$ |
| Power Law, $A_o$ (Pa · sec) | $2.40 \times 10^5$ | $2.00 \times 10^5$ | $2.70 \times 10^5$ | $1.70 \times 10^5$ | $1.90 \times 10^5$ |
| Power law exponent, n | −0.762 | −0.745 | −0.736 | −0.72 | −0.758 |
| Shear Thinning Index | 0.9962 | 0.9957 | 0.9952 | 0.9948 | 0.9962 |
| Mooney Scorch at 125° C. | | | | | |
| Min Viscosity (MU) | 32.2 | 31.2 | 32.6 | 27.8 | 29.9 |
| t10-t5 (min) | 1.5 | 1.8 | 1.4 | 1.5 | 1.3 |
| t5-t1 (min) | 3.3 | 3.6 | 2.5 | 3.1 | 3.0 |
| Ms t1 (min) | 8.1 | 7.4 | 5.9 | 7.7 | 7.1 |
| Ms t5 (min) | 11.4 | 11.0 | 8.4 | 10.8 | 10.2 |
| Ms t10 (min) | 12.9 | 12.8 | 9.8 | 12.3 | 11.4 |
| Cure-Development Characteristics (ODR)180° C. ± 3 deg Arc | | | | | |
| ML (dN · m) | 11.9 | 9.4 | 9.6 | 8.2 | 8.5 |
| MH (dN · m) | 76.9 | 75.5 | 74.7 | 74.9 | 73.1 |
| ts2 (min) | 1.1 | 1.0 | 0.9 | 1.0 | 1.0 |
| t25 (min) | 1.5 | 1.4 | 1.3 | 1.4 | 1.4 |
| t50 (min) | 1.8 | 1.8 | 1.6 | 1.7 | 1.9 |
| t90 (min) | 4.4 | 4.6 | 4.1 | 4.3 | 4.5 |

TABLE 6-continued

| Example | 1 | 2 | 3 | 4 | 5 |
|---|---|---|---|---|---|
| Peak Rate (dN · m/min) | 54.8 | 50.7 | 61.2 | 56.8 | 47.3 |
| MH − ML (dN · m) | 65 | 66.1 | 65.1 | 66.7 | 64.6 |
| Press Cure (180° C. for 8 minutes) | | | | | |
| Hardness (Shore A) | 66 | 67 | 66 | 66 | 68 |
| 100% Modulus (MPa) | 4.3 | 4.7 | 3.4 | 4.2 | 4.3 |
| 300% Modulus (MPa) | 12.1 | 12.2 | 8.9 | 10.2 | 11.1 |
| Stress @ Break (MPa) | 13.5 | 12.4 | 10.7 | 11.2 | 11.8 |
| Strain @ Break (5) | 352 | 312 | 387 | 362 | 331 |
| Tear- Die C (Avg. Peak Value) (N/mm) | 40.0 | 41.8 | 41.3 | 40.6 | 39.7 |
| Compound Green Tear Strength (Die C) | | | | | |
| Die C:Max Value (N/mm) | 7.2 | 4.7 | 3.9 | 4.2 | 4.3 |
| Compression Set (press cure 180° C. for 10 minutes) | | | | | |
| 168 h, 70 C., 25% Deflection (%) | 38 | 35 | 32 | 30 | 29 |

Figure 3:
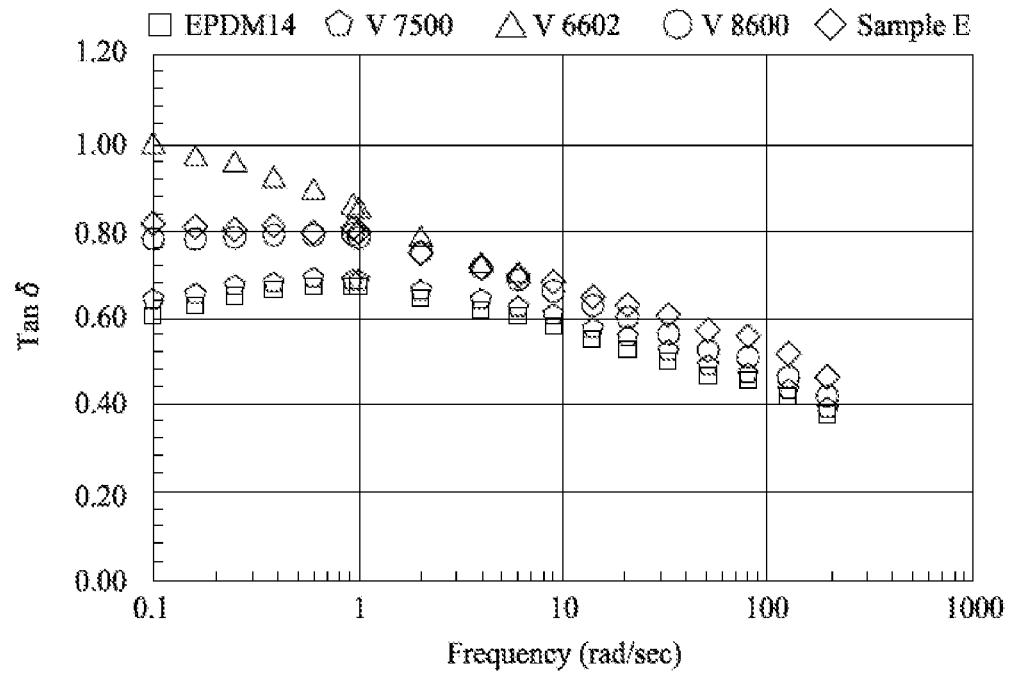
FIG. 3 shows the Small Angle Oscillatory Shear (SAOS) measurements on the polymer sample, where tan δ is plotted a varying frequency.

FIG. 3 shows the SAOS measurements on the polymer sample, where tan δ is plotted a varying frequency. The experiments were conducted at 125° C. with an applied strain of 14%. The response of the EPDM14 polymer is almost identical to that of VISTALON™ 7500. Both VISTALON™ 6602 (bi-modal) and Sample E have higher tan δ across the frequency range compared to the EPDM14 polymer.

Figure 4:
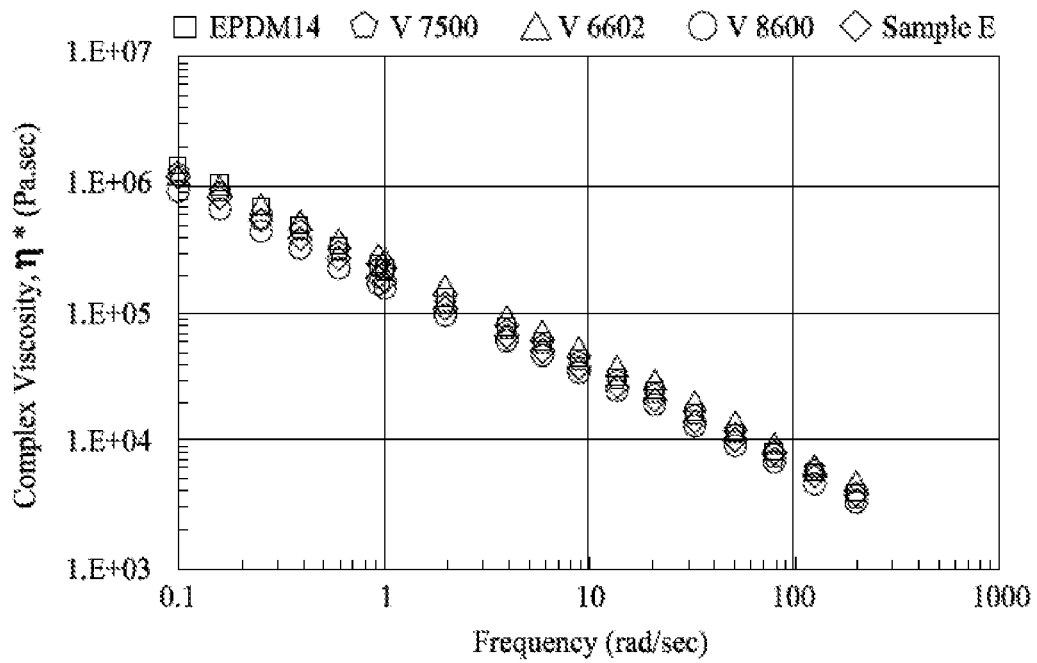
FIG. 4 shows a plot of complex viscosity versus frequency for the various polymer samples.

FIG. 4 shows a plot of complex viscosity versus frequency for the various polymer samples. The EPDM14 sample shows shear sensitivity similar to that of the VISTALON™ 7500 polymer. The higher shear thinning exhibited by EPDM14 is a reflection of the degree of branching in the polymer.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A compound comprising:
    100 parts per hundred rubber (phr) of a branched ethylene propylene diene monomer (EPDM) elastomer comprising 35 wt % to 70 wt % ethylene derived units, 20 wt % to 64 wt % propylene derived units, and 1 wt % to 10 wt % diene derived units, wherein the EPDM elastomer has a Mooney viscosity (ML) (1+4) at 125° C. of 30 MU to 120 MU, a corrected Mooney relaxation area (cMLRA) at 80 ML of 300 MU·sec to 1000 MU·sec, and long chain branching (LCB) g' (vis) of 0.80 to 1.0;
    75 phr to 200 phr of a filler;
    25 phr to 125 phr of a processing oil; and
    5 phr to 50 phr of a curative;
    wherein the branched EPDM has a number average molecular weight (Mn) of 35,000 g/mol to 125,000 g/mol.

2. The compound of claim 1, wherein the branched EPDM has a weight average molecular weight (Mw) of 215,000 g/mol to 350,000 g/mol.

3. The compound of claim 1, wherein the branched EPDM has a z-average molecular weight (Mz) of 375,000 g/mol to 1,000,000 g/mol.

4. The compound claim 1, wherein the branched EPDM has a Mw/Mn of 2.25 to 4.5.

5. The compound of claim 1, wherein the branched EPDM has a Mz/Mn of 5.0 to 12.5.

6. The compound of claim 1, wherein the compound has a Mooney ratio of 0.8 to 1.0.

7. The compound of claim 1 further comprising: 0.1 phr to 25 phr of a foaming agent.

8. A method comprising:
    producing a compound comprising:
        100 parts per hundred rubber (phr) of a branched ethylene propylene diene monomer (EPDM) elastomer comprising 35 wt % to 70 wt % ethylene derived units, 20 wt % to 64 wt % propylene derived units, and 1 wt % to 10 wt % diene derived units, wherein the EPDM elastomer has a Mooney viscosity (ML) (1+4) at 125° C. of 30 MU to 120 MU, a corrected Mooney relaxation area (cMLRA) at 80 ML of 300 MU·sec to 1000 MU·sec, and long chain branching (LCB) g' (vis) of 0.80 to 1.0;

75 phr to 200 phr of a filler;

25 phr to 125 phr of a processing oil; and 5 phr to 50 phr of a curative; and vulcanizing the compound;

wherein the branched EPDM has a number average molecular weight (Mn) of 35,000 g/mol to 125,000 g/mol.

9. The method of claim 8, wherein the branched EPDM has a weight average molecular weight (Mw) of 215,000 g/mol to 350,000 g/mol.

10. The method of claim 8, wherein the branched EPDM has a z-average molecular weight (Mz) of 375,000 g/mol to 1,000,000 g/mol.

11. The method of claim 8, wherein the branched EPDM has a Mw/Mn of 2.25 to 4.5.

12. The method of claim 8, wherein the branched EPDM has a Mz/Mn of 5.0 to 12.5.

13. The method of claim 8, wherein the compound has a Mooney ratio of 0.8 to 1.0.

14. The method of claim 8, wherein the compound further comprises 0.1 phr to 25 phr of a foaming agent, and wherein the method further comprises foaming the compound.

15. The method of claim 8 further comprising: extruding the compound and forming an article.

16. The method of claim 15, wherein the article is an automotive weather seal, a non-automotive weather seal, or a building profile.

17. The method of claim 8 further comprising: molding the compound and forming an article.

18. The method of claim 17, wherein the article is a seal, a gasket, a hose, a roof sheet, a film, or a cable jacket.

19. A method comprising:

polymerizing ethylene monomers, propylene monomers, and diene monomers in the presence of 2-(8-anilino-5,6,7,8-tetrahydronaphthalen-1-yl)-N-(2,6-diisopropylphenyl) quinolin-8-amido hafnium dimethyl and dimethylanilinium tetrakis(pentafluorophenyl)borane to produce a branched ethylene propylene diene monomer (EPDM) elastomer comprising 35 wt % to 70 wt % ethylene derived units, 20 wt % to 64 wt % propylene derived units, and 1 wt % to 10 wt % diene derived units, wherein the EPDM elastomer has a Mooney viscosity (ML) (1+4) at 125° C. of 30 MU to 120 MU, a corrected Mooney relaxation area (cMLRA) at 80 ML of 300 MU·sec to 1000 MU·sec, and long chain branching (LCB) g' (vis) of 0.80 to 1.0.

* * * * *